(12) United States Patent
Onoyama

(10) Patent No.: US 11,971,543 B2
(45) Date of Patent: *Apr. 30, 2024

(54) DISPLAY CONTROL APPARATUS, HEAD MOUNTED DISPLAY, AND DISPLAY CONTROL METHOD

(71) Applicant: SONY GROUP CORPORATION, Tokyo (JP)

(72) Inventor: Yusuke Onoyama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,373

(22) Filed: Apr. 29, 2022

(65) Prior Publication Data

US 2022/0397760 A1    Dec. 15, 2022

Related U.S. Application Data

(63) Continuation of application No. 16/755,947, filed as application No. PCT/JP2018/032533 on Sep. 3, 2018, now Pat. No. 11,347,052.

(51) Int. Cl.
*G09G 5/00* (2006.01)
*G02B 27/01* (2006.01)
*H04N 13/344* (2018.01)

(52) U.S. Cl.
CPC ..... *G02B 27/0101* (2013.01); *G02B 27/0172* (2013.01); *H04N 13/344* (2018.05); *G02B 2027/014* (2013.01); *G02B 2027/0147* (2013.01)

(58) Field of Classification Search
CPC ...... G02B 2027/014; G02B 2027/0147; G02B 27/0101; G02B 27/017; G02B 27/0172; G09G 5/00; G09G 5/36; H04N 13/344
See application file for complete search history.

(56) References Cited

U.S. PATENT DOCUMENTS 9,454,010 B1    9/2016 Passmore et al.
10,248,198 B1    4/2019 Kim
(Continued)

FOREIGN PATENT DOCUMENTS

JP    09-009253 A    1/1997
JP    2010-107582 A    5/2010
(Continued)

OTHER PUBLICATIONS

International Search Report and Written Opinion of PCT Application No. PCT/JP2018/032533, dated Nov. 20, 2018, 07 pages of English Translation and 08 pages of ISRWO.
(Continued)

*Primary Examiner* — Insa Sadio
(74) *Attorney, Agent, or Firm* — CHIP LAW GROUP

(57) ABSTRACT

There is provided a display control apparatus capable of displaying a high-quality image while inhibiting a load at the time of displaying the image in front of a user. There is provided a display control apparatus including a signal processing unit that performs signal processing in which a first mode and a second mode are switchable at a first region in a screen and a region other than the first region in the screen, display being performed at a first resolution in the first mode, display being performed at a second resolution in the second mode, in which the signal processing unit performs display while reducing a resolution in the second mode toward an outer periphery of the screen.

9 Claims, 36 Drawing Sheets

(56) References Cited

U.S. PATENT DOCUMENTS

| | | |
|---|---|---|
| 2002/0109819 A1 | 8/2002 | Tuval |
| 2004/0227703 A1 | 11/2004 | Lamvik et al. |
| 2007/0188407 A1* | 8/2007 | Nishi .................... F16M 13/04 348/E5.145 |
| 2007/0229557 A1* | 10/2007 | Okumura ............. H04N 9/3188 345/698 |
| 2007/0236466 A1 | 10/2007 | Hotelling |
| 2009/0309811 A1 | 12/2009 | Hinton |
| 2010/0056274 A1 | 3/2010 | Uusitalo et al. |
| 2011/0170067 A1 | 7/2011 | Sato et al. |
| 2014/0146394 A1 | 5/2014 | Tout et al. |
| 2015/0049120 A1 | 2/2015 | He et al. |
| 2015/0277841 A1 | 10/2015 | Lanier et al. |
| 2016/0240013 A1 | 8/2016 | Spitzer |
| 2017/0038588 A1 | 2/2017 | Passmore et al. |
| 2017/0039766 A1 | 2/2017 | Passmore et al. |
| 2017/0160796 A1 | 6/2017 | Oto |
| 2017/0171533 A1 | 6/2017 | Benitez et al. |
| 2017/0208318 A1 | 7/2017 | Passmore et al. |
| 2017/0236466 A1 | 8/2017 | Spitzer et al. |
| 2017/0287112 A1 | 10/2017 | Stafford et al. |
| 2017/0287446 A1 | 10/2017 | Young et al. |
| 2018/0018943 A1 | 1/2018 | Clarke et al. |
| 2018/0040676 A1 | 2/2018 | Hack et al. |
| 2018/0045960 A1 | 2/2018 | Palacios et al. |
| 2018/0090052 A1 | 3/2018 | Marsh et al. |
| 2018/0095274 A1 | 4/2018 | Lee et al. |
| 2018/0096461 A1 | 4/2018 | Okayama et al. |
| 2018/0136471 A1 | 5/2018 | Miller et al. |
| 2018/0182174 A1 | 6/2018 | Choi |
| 2018/0196512 A1 | 7/2018 | Kim et al. |
| 2018/0275410 A1 | 9/2018 | Yeoh et al. |
| 2018/0295331 A1 | 10/2018 | Tardif et al. |
| 2018/0308455 A1 | 10/2018 | Hicks et al. |
| 2019/0005884 A1 | 1/2019 | Yoo |
| 2019/0025475 A1 | 1/2019 | Piskunov et al. |
| 2019/0102865 A1 | 4/2019 | Hensley et al. |
| 2019/0273910 A1 | 9/2019 | Malaika |
| 2019/0279546 A1 | 9/2019 | Peuhkurinen et al. |
| 2019/0281279 A1 | 9/2019 | Peuhkurinen et al. |
| 2019/0318677 A1 | 10/2019 | Lu et al. |
| 2020/0152105 A1 | 5/2020 | Ishii |
| 2020/0174263 A1 | 6/2020 | Greenberg |
| 2020/0195912 A1 | 6/2020 | Smith et al. |

FOREIGN PATENT DOCUMENTS

| | | |
|---|---|---|
| JP | 2016-153899 A | 8/2016 |
| JP | 2016-191845 A | 11/2016 |
| KR | 10-2015-0001425 A | 1/2015 |
| WO | 2002/065443 A1 | 8/2002 |
| WO | 2015/099215 A1 | 7/2015 |
| WO | 2016/002657 A1 | 1/2016 |
| WO | 2016/157677 A1 | 10/2016 |
| WO | 2017/142613 A1 | 8/2017 |

OTHER PUBLICATIONS

International Preliminary Report on Patentability of PCT Application No. PCT/JP2018/032533, dated May 7, 2020, 07 pages of English Translation and 04 pages of IPRP.

Notice of Allowance for U.S. Appl. No. 16/755,947, dated Jan. 27, 2022, 5 pages.

Non-Final Office Action for U.S. Appl. No. 16/755,947, dated Jan. 8, 2021, 13 pages.

Final Office Action for U.S. Appl. No. 16/755,947, dated Jul. 22, 2021, 17 pages.

Advisory Action for U.S. Appl. No. 16/755,947, dated Dec. 27, 2021, 2 pages.

Advisory Action for U.S. Appl. No. 16/755,947, dated Oct. 25, 2021, 3 pages.

* cited by examiner

FIG. 2

A: LOW-IMAGE-QUALITY REGION (LARGE PIXEL SIZE)
B: HIGH-IMAGE-QUALITY REGION (SMALL PIXEL SIZE)

X: DISPLAYED REGION (DISPLAY REGION)
d: VIEWING DISTANCE
α: VIEWING ANGLE (FOV)

$$x = d \times \tan(\alpha)$$

FIG. 12A

| VIEWING ANGLE | MAGNIFICATION |
|---|---|
| 0 | 1 |
| 2 | 1 |
| 4 | 1 |
| 6 | 1 |
| 8 | 1 |
| 10 | 1 |
| 12 | 1 |
| 14 | 1 |
| 16 | 1 |
| 18 | 1 |
| 20 | 1 |
| 22 | 1 |
| 24 | 1 |
| 26 | 1 |
| 28 | 1 |
| 30 | 1 |
| 32 | 1 |
| 34 | 1 |
| 36 | 1 |
| 38 | 1 |
| 40 | 1 |
| 42 | 1 |
| 44 | 1 |
| 46 | 1 |
| 48 | 1 |
| 50 | 1 |

| VIEWING ANGLE | MAGNIFICATION |
|---|---|
|  |  |
| 52 | 1 |
| 54 | 1 |
| 56 | 1 |
| 58 | 2 |
| 60 | 2 |
| 62 | 2 |
| 64 | 2 |
| 66 | 2 |
| 68 | 2 |
| 70 | 2 |
| 72 | 2 |
| 74 | 2 |
| 76 | 2 |
| 78 | 2 |
| 80 | 3 |
| 82 | 3 |
| 84 | 3 |
| 86 | 3 |
| 88 | 3 |
| 90 | 3 |
| 92 | 3 |
| 94 | 4 |
| 96 | 4 |
| 98 | 4 |
| 100 | 4 |

FIG. 15A

| VIEWING ANGLE | k (DISPLAY AREA) |
|---|---|
| 0 | 0 |
| 1 | 1 (REFERENCE POINT) |
| 2 | 2.000609544 |
| 3 | 3.002439664 |
| 4 | 4.006104373 |
| 5 | 5.012222177 |
| 6 | 6.021417606 |
| 7 | 7.034322783 |
| 8 | 8.051579028 |
| 9 | 9.073838509 |
| 10 | 10.10176596 |
| 11 | 11.13604045 |
| 12 | 12.17735726 |
| 13 | 13.22642981 |
| 14 | 14.28399172 |
| 15 | 15.35079895 |
| 16 | 16.42763215 |
| 17 | 17.51529901 |
| 18 | 18.61463693 |
| 19 | 19.72651575 |
| 20 | 20.85184076 |
| 21 | 21.99155584 |
| 22 | 23.14664698 |
| 23 | 24.31814593 |
| 24 | 25.5071343 |
| 25 | 26.71474784 |
| | |

FIG. 15B

| VIEWING ANGLE | k (DISPLAY AREA) |
|---|---|
|  |  |
| 26 | 27.94218129 |
| 27 | 29.19069345 |
| 28 | 30.46161294 |
| 29 | 31.75634429 |
| 30 | 33.07637477 |
| 31 | 34.42328181 |
| 32 | 35.7987412 |
| 33 | 37.2045361 |
| 34 | 38.64256705 |
| 35 | 40.114863 |
| 36 | 41.62359355 |
| 37 | 43.17108262 |
| 38 | 44.75982357 |
| 39 | 46.39249619 |
| 40 | 48.07198567 |
| 41 | 49.80140386 |
| 42 | 51.58411315 |
| 43 | 53.4237535 |
| 44 | 55.32427286 |
| 45 | 57.28996163 |
| 46 | 59.32549194 |
| 47 | 61.43596225 |
| 48 | 63.62694836 |
| 49 | 65.90456191 |
| 50 | 68.27551759 |

FIG. 17A

| VIEWING ANGLE | k (DISPLAY AREA) | p |
|---|---|---|
| 0 | 0 | 0 |
| 1 | 1 (REFERENCE POINT) | 29 |
| 2 | 2.000609544 | 59 |
| 3 | 3.002439664 | 88 |
| 4 | 4.006104373 | 117 |
| 5 | 5.012222177 | 147 |
| 6 | 6.021417606 | 176 |
| 7 | 7.034322783 | 206 |
| 8 | 8.051579028 | 236 |
| 9 | 9.073838509 | 266 |
| 10 | 10.10176596 | 296 |
| 11 | 11.13604045 | 326 |
| 12 | 12.17735726 | 357 |
| 13 | 13.22642981 | 387 |
| 14 | 14.28399172 | 418 |
| 15 | 15.35079895 | 450 |
| 16 | 16.42763215 | 481 |
| 17 | 17.51529901 | 513 |
| 18 | 18.61463693 | 545 |
| 19 | 19.72651575 | 578 |
| 20 | 20.85184076 | 611 |
| 21 | 21.99155584 | 644 |
| 22 | 23.14664698 | 678 |
| 23 | 24.31814593 | 712 |
| 24 | 25.5071343 | 747 |
| 25 | 26.71474784 | 783 |

FIG. 17B

| VIEWING ANGLE | k (DISPLAY AREA) | p |
|---|---|---|
|  |  |  |
| 26 | 27.94218129 | 819 |
| 27 | 29.19069345 | 855 |
| 28 | 30.46161294 | 892 |
| 29 | 31.75634429 | 930 |
| 30 | 33.07637477 | 969 |
| 31 | 34.42328181 | 1008 |
| 32 | 35.7987412 | 1049 |
| 33 | 37.2045361 | 1090 |
| 34 | 38.64256705 | 1132 |
| 35 | 40.114863 | 1175 |
| 36 | 41.62359355 | 1219 |
| 37 | 43.17108262 | 1265 |
| 38 | 44.75982357 | 1311 |
| 39 | 46.39249619 | 1359 |
| 40 | 48.07198567 | 1408 |
| 41 | 49.80140386 | 1459 |
| 42 | 51.58411315 | 1511 |
| 43 | 53.4237535 | 1565 |
| 44 | 55.32427286 | 1621 |
| 45 | 57.28996163 | 1678 |
| 46 | 59.32549194 | 1738 |
| 47 | 61.43596225 | 1800 |
| 48 | 63.62694836 | 1864 |
| 49 | 65.90456191 | 1931 |
| 50 | 68.27551759 | 2000 |

FIG. 19A

| VIEWING ANGLE | k (DISPLAY AREA) | p | MAGNIFICATION |
|---|---|---|---|
| 0 | 0 | 0 | 1 |
| 1 | 1 (REFERENCE POINT) | 29 | 1 |
| 2 | 2.000609544 | 59 | 1 |
| 3 | 3.002439664 | 88 | 1 |
| 4 | 4.006104373 | 117 | 1 |
| 5 | 5.012222177 | 147 | 1 |
| 6 | 6.021417606 | 176 | 1 |
| 7 | 7.034322783 | 206 | 1 |
| 8 | 8.051579028 | 236 | 1 |
| 9 | 9.073838509 | 266 | 1 |
| 10 | 10.10176596 | 296 | 1 |
| 11 | 11.13604045 | 326 | 1 |
| 12 | 12.17735726 | 357 | 1 |
| 13 | 13.22642981 | 387 | 1 |
| 14 | 14.28399172 | 418 | 1 |
| 15 | 15.35079895 | 450 | 1 |
| 16 | 16.42763215 | 481 | 1 |
| 17 | 17.51529901 | 513 | 1 |
| 18 | 18.61463693 | 545 | 1 |
| 19 | 19.72651575 | 578 | 1 |
| 20 | 20.85184076 | 611 | 1 |
| 21 | 21.99155584 | 644 | 1 |
| 22 | 23.14664698 | 678 | 1 |
| 23 | 24.31814593 | 712 | 1 |
| 24 | 25.5071343 | 747 | 1 |
| 25 | 26.71474784 | 783 | 1 |

FIG. 19B

| VIEWING ANGLE | k (DISPLAY AREA) | p | MAGNIFICATION |
|---|---|---|---|
| 26 | 27.94218129 | 819 | 1 |
| 27 | 29.19069345 | 855 | 1 |
| 28 | 30.46161294 | 892 | 1 |
| 29 | 31.75634429 | 930 | 2 |
| 30 | 33.07637477 | 969 | 2 |
| 31 | 34.42328181 | 1008 | 2 |
| 32 | 35.7987412 | 1049 | 2 |
| 33 | 37.2045361 | 1090 | 2 |
| 34 | 38.64256705 | 1132 | 2 |
| 35 | 40.114863 | 1175 | 2 |
| 36 | 41.62359355 | 1219 | 2 |
| 37 | 43.17108262 | 1265 | 2 |
| 38 | 44.75982357 | 1311 | 2 |
| 39 | 46.39249619 | 1359 | 2 |
| 40 | 48.07198567 | 1408 | 3 |
| 41 | 49.80140386 | 1459 | 3 |
| 42 | 51.58411315 | 1511 | 3 |
| 43 | 53.4237535 | 1565 | 3 |
| 44 | 55.32427286 | 1621 | 3 |
| 45 | 57.28996163 | 1678 | 3 |
| 46 | 59.32549194 | 1738 | 3 |
| 47 | 61.43596225 | 1800 | 4 |
| 48 | 63.62694836 | 1864 | 4 |
| 49 | 65.90456191 | 1931 | 4 |
| 50 | 68.27551759 | 2000 | 4 |

FIG. 21A

| VIEWING ANGLE | k (DISPLAY AREA) | p | MAGNIFICATION | SELECTION GATE ID | 12bit |
|---|---|---|---|---|---|
| 0 | 0 | 0 | 1 | 0 | 000000000000 |
| 1 | 1 (REFERENCE POINT) | 29 | 1 | 29 | 000000011101 |
| 2 | 2.000609544 | 59 | 1 | 59 | 000000111011 |
| 3 | 3.002439664 | 88 | 1 | 88 | 000001011000 |
| 4 | 4.006104373 | 117 | 1 | 117 | 000001110101 |
| 5 | 5.012222177 | 147 | 1 | 147 | 000010010011 |
| 6 | 6.021417606 | 176 | 1 | 176 | 000010110000 |
| 7 | 7.034322783 | 206 | 1 | 206 | 000011001110 |
| 8 | 8.051579028 | 236 | 1 | 236 | 000011101100 |
| 9 | 9.073838509 | 266 | 1 | 266 | 000100001010 |
| 10 | 10.10176596 | 296 | 1 | 296 | 000100101000 |
| 11 | 11.13604045 | 326 | 1 | 326 | 000101000110 |
| 12 | 12.17735726 | 357 | 1 | 357 | 000101100101 |
| 13 | 13.22642981 | 387 | 1 | 387 | 000110000011 |
| 14 | 14.28399172 | 418 | 1 | 418 | 000110100010 |
| 15 | 15.35079895 | 450 | 1 | 450 | 000111000010 |
| 16 | 16.42763215 | 481 | 1 | 481 | 000111100001 |
| 17 | 17.51529901 | 513 | 1 | 513 | 001000000001 |
| 18 | 18.61463693 | 545 | 1 | 545 | 001000100001 |
| 19 | 19.72651575 | 578 | 1 | 578 | 001001000010 |
| 20 | 20.85184076 | 611 | 1 | 611 | 001001100011 |
| 21 | 21.99155584 | 644 | 1 | 644 | 001010000100 |
| 22 | 23.14664698 | 678 | 1 | 678 | 001010100110 |
| 23 | 24.31814593 | 712 | 1 | 712 | 001011001000 |
| 24 | 25.5071343 | 747 | 1 | 747 | 001011101011 |
| 25 | 26.71474784 | 783 | 1 | 783 | 001100001111 |

FIG. 21B

| VIEWING ANGLE | k (DISPLAY AREA) | p | MAGNIFICATION | SELECTION GATE ID | 12bit |
|---|---|---|---|---|---|
|  |  |  |  |  |  |
| 26 | 27.94218129 | 819 | 1 | 819 | 001100110011 |
| 27 | 29.19069345 | 855 | 1 | 855 | 001101010111 |
| 28 | 30.46161294 | 892 | 1 | 892 | 001101111100 |
| 29 | 31.75634429 | 930 | 2 | 930 | 001110100010 |
| 30 | 33.07637477 | 969 | 2 | 949 | 001111001001 |
| 31 | 34.42328181 | 1008 | 2 | 969 | 001111110000 |
| 32 | 35.7987412 | 1049 | 2 | 989 | 010000011001 |
| 33 | 37.2045361 | 1090 | 2 | 1010 | 010001000010 |
| 34 | 38.64256705 | 1132 | 2 | 1031 | 010001101100 |
| 35 | 40.114863 | 1175 | 2 | 1052 | 010010010111 |
| 36 | 41.62359355 | 1219 | 2 | 1074 | 010011000011 |
| 37 | 43.17108262 | 1265 | 2 | 1097 | 010011110001 |
| 38 | 44.75982357 | 1311 | 2 | 1120 | 010100011111 |
| 39 | 46.39249619 | 1359 | 2 | 1144 | 010101001111 |
| 40 | 48.07198567 | 1408 | 3 | 1169 | 010110000000 |
| 41 | 49.80140386 | 1459 | 3 | 1186 | 010110110011 |
| 42 | 51.58411315 | 1511 | 3 | 1203 | 010111100111 |
| 43 | 53.4237535 | 1565 | 3 | 1221 | 011000011101 |
| 44 | 55.32427286 | 1621 | 3 | 1240 | 011001010101 |
| 45 | 57.28996163 | 1678 | 3 | 1259 | 011010001110 |
| 46 | 59.32549194 | 1738 | 3 | 1279 | 011011001010 |
| 47 | 61.43596225 | 1800 | 4 | 1299 | 011100001000 |
| 48 | 63.62694836 | 1864 | 4 | 1315 | 011101001000 |
| 49 | 65.90456191 | 1931 | 4 | 1331 | 011110001011 |
| 50 | 68.27551759 | 2000 | 4 | 1349 | 011111010000 |

DISPLAY CONTROL APPARATUS, HEAD MOUNTED DISPLAY, AND DISPLAY CONTROL METHOD

CROSS REFERENCE TO RELATED APPLICATIONS

The present application is a continuation application of U.S. patent application Ser. No. 16/755,947, filed Apr. 14, 2020, which is a National Phase of International Patent Application No. PCT/JP2018/032533 filed on Sep. 3, 2018, which claims the benefit of priority from Japanese Patent Application No. 2017-204296 filed in the Japan Patent Office on Oct. 23, 2017. Each of the above-referenced applications is hereby incorporated herein by reference in its entirety.

TECHNICAL FIELD

The present disclosure relates to a display control apparatus, a head mounted display, a display control method, and a computer program.

BACKGROUND ART

In a small display represented by a micro display, possible applications are used through a lens at a place very close to human eyes, such as an electronic viewfinder (EVF) and a head mounted display (HMD). For example, Patent Document 1 and the like disclose a head mounted display.

CITATION LIST

Patent Document

Patent Document 1: Japanese Patent Application Laid-Open No. 2016-153899

SUMMARY OF THE INVENTION

Problems to be Solved by the Invention

A small display used for a head mounted display is required to display high-definition content. In contrast, display of high-definition content increases a load at the time of display processing.

Then, in the disclosure, there is proposed a new and improved display control apparatus, head mounted display, display control method, and computer program capable of displaying a high-quality image while inhibiting a load at the time of displaying the image in front of a user.

Solutions to Problems

According to the disclosure, there is provided a display control apparatus including a signal processing unit that performs signal processing in which a first mode and a second mode are switchable at a first region in a screen and a region other than the first region in the screen, display being performed in the screen at a first resolution in the first mode, display being performed in the screen at a second resolution in the second mode.

Furthermore, according to the disclosure, a head mounted display including the above-described display control apparatus is provided.

Furthermore, according to the disclosure, there is provided a display control method including a processor performing signal processing in which a first mode and a second mode are switchable at a first region in a screen and a region other than the first region in the screen, display being performed in the screen at a first resolution in the first mode, display being performed in the screen at a second resolution in the second mode.

Furthermore, according to the disclosure, there is provided a computer program causing a computer to perform signal processing in which a first mode and a second mode are switchable at a first region in a screen and a region other than the first region in the screen, display being performed in the screen at a first resolution in the first mode, display being performed in the screen at a second resolution in the second mode.

Effects of the Invention

As described above, according to the disclosure, there can be proposed a new and improved display control apparatus, head mounted display, display control method, and computer program capable of displaying a high-quality image while inhibiting a load at the time of displaying the image in front of a user.

Note that the above-described effect is not necessarily limitative, and, along with or in place of the above-described effect, any of the effects illustrated in the present specification, or other effects that can be grasped from the specification may be exhibited.

BRIEF DESCRIPTION OF DRAWINGS

FIG. 2 is an explanatory view outlining a display apparatus according to an embodiment of the disclosure.

FIG. 12A is an explanatory table illustrating the relation between a viewing angle and a pixel magnification.

FIG. 15A is an explanatory view illustrating values stored in a look-up table of a display rate to a viewing angle.

FIG. 15B is an explanatory view illustrating values stored in the look-up table of a display rate to a viewing angle.

FIG. 17A is an explanatory view illustrating values, stored in the look-up table, of the pixel number to a viewing angle.

FIG. 17B is an explanatory view illustrating values, stored in the look-up table, of the pixel number to a viewing angle.

FIG. 19A is an explanatory view illustrating values, stored in the look-up table, of a magnification to a pixel.

FIG. 19B is an explanatory view illustrating values, stored in the look-up table, of a magnification to a pixel.

FIG. 21A is an explanatory table illustrating a selection gate ID for each viewing angle and a value obtained by representing each selection gate ID at 12 bits.

FIG. 21B is an explanatory table illustrating the selection gate ID for each viewing angle and the value obtained by representing each selection gate ID at 12 bits.

MODE FOR CARRYING OUT THE INVENTION

A preferred embodiment of the disclosure will be described in detail below with reference to the accompanying drawings. Note that, in the specification and the drawings, components having substantially the same functional configuration will be assigned the same signs, and redundant description will be omitted.

Note that the description will be given in the following order.

1. Embodiment of Disclosure
1.1. Outline
1.2. Configuration Example and Operation Example
2. Conclusion

1. EMBODIMENT OF DISCLOSURE 1.1. Outline

Prior to describing an embodiment of the disclosure in detail, first, the embodiment of the disclosure will be outlined.

Substrates for achieving a panel in a spontaneous light emitting display of current-driven type represented by an organic EL display are roughly classified into amorphous substrates and Si substrates. The amorphous substrates are represented by LTPS and an oxide. The Si substrates are represented by silicon (Si) single crystal. The advantage of the amorphous substrates is that the amorphous substrates can be used for a large format display. The advantage of the Si substrates is that the Si substrates can achieve a small and high-definition display. Possible applications are also classified on the basis of characteristics. The amorphous substrates are applied to large TVs and medium-sized displays for a smartphone. The Si substrates are applied to small displays such as electronic viewfinders and head mounted displays.

In a small display represented by a micro display, possible applications are used through a lens at a place very close to human eyes, such as an electronic viewfinder (EVF) and a head mounted display (HMD). Such a series of applications is called a near-to-eye (NTE) application. An NTE application of an EVF and that of an HMD differ in an optical system. The EVF shows a video by bringing a real image magnified mainly by a lens into eyes, while the HMD reproduces a virtual image magnified many times on the retina. For example, a micro display of an HMD used for putting a 100-inch display 20 m ahead has a size of approximately one inch, which shows very high magnification.

Figure 1:
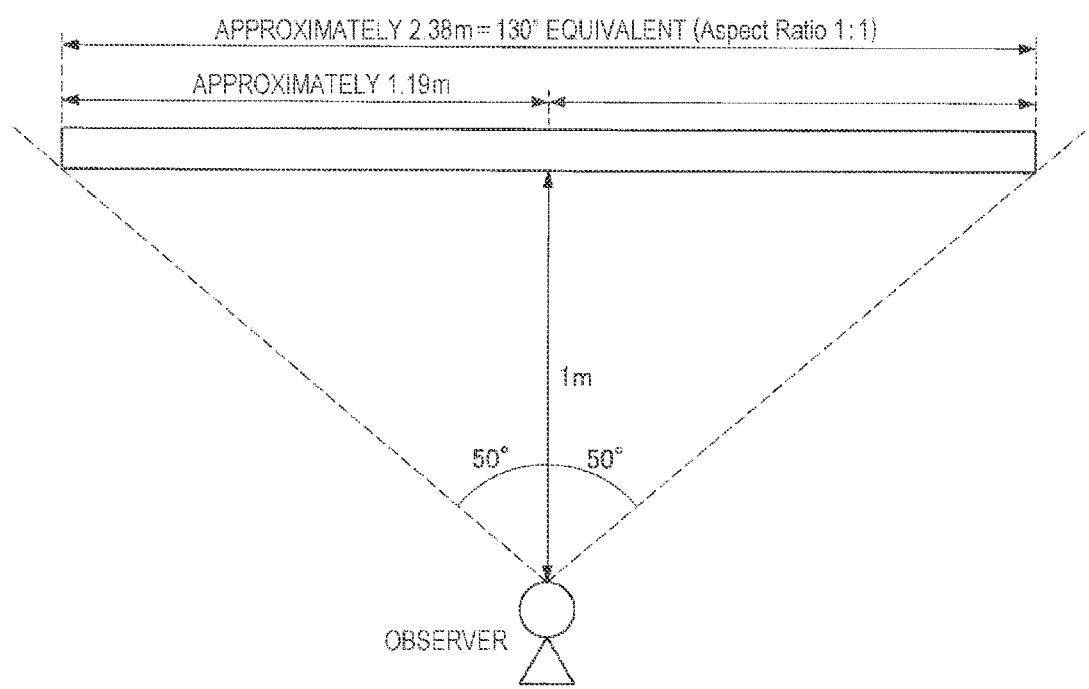
FIG. 1 is an explanatory view for illustrating an FOV.

In recent years, virtual reality (VR) has been actively developed. The VR is an application that provides a video completely covering the field of view of a user at the time when the user wears a head mounted display, and gives a sense of immersion. The field of view (FOV) is a very important parameter for giving the sense of immersion. In a case where the FOV exceeds 100 degrees, a video can cover the entire field of view. FIG. 1 is an explanatory view for illustrating the FOV. For example, in a case where the horizontal and vertical FOVs at one meter ahead from eyes of a user are both 100 degrees, the magnified display size exceeds 130 inches. In a case where the display size is extended to approximately 130 inches, a VR apparatus using a display with low resolution expresses a video with no sense of resolution. For this reason, a display used in a VR apparatus requires a resolution exceeding 4 k×4 k with a field of view of 8 k×8 k to 16 k×16 k. Here, since a VR display needs a high FOV both horizontally and vertically, a 1:1 aspect is strongly required.

A considerably large system is necessary for driving the above-described display with a resolution exceeding 4 k×4 k for VR. For example, approximately twice the bit rate of a drive system of a resolution of 4 k×2 k and a refresh rate of 60 fps is necessary for driving a display with a resolution exceeding 4 k×4 k. Furthermore, VR requires high-speed driving of 120 fps or more, so that the bit rate is further doubled. That is, approximately four times the bit rate of the drive system of a resolution of 4 k×2 k and a refresh rate of 60 fps is necessary. In a case where the resolution is further raised to 8 k×8 k, approximately 16 times the bit rate of the drive system of a resolution of 4 k×2 k and a refresh rate of 60 fps is necessary.

In addition to the bit rate, unlike a purpose of normal direct vision, it is necessary in VR to feed back a result of tracking (head tracking) of the motion of a head mounted display worn on a head to the system and change video data. Therefore, it is necessary to constantly perform signal processing on large amounts of video data. Large amounts of system costs are necessary for performing signal processing on data of 16 times or more of 4 k×2 k at high speed, and such signal processing is impractical. Therefore, a VR display capable of expressing a high-definition video with low load is required.

In view of the above-described points, the present discloser has conducted intensive studies on a technique capable of displaying a high-quality image while inhibiting a load at the time of displaying the image in front of a user. As a result, as described below, the present discloser has devised a technique capable of displaying a high-quality image while inhibiting a load at the time of displaying the image in front of a user.

The embodiment of the disclosure has been outlined above. Subsequently, the embodiment of the disclosure will be described in detail.

1.2. Configuration Example and Operation Example

In the present embodiment, a display apparatus capable of expressing high resolution with low load is provided. Specifically, the embodiment is directed to a display capable of displaying different pixel sizes in the same panel. FIG. 2 is an explanatory view outlining a display apparatus according to the embodiment of the disclosure, and illustrates a display capable of displaying different pixel sizes in the same panel. The reason for this will be described.

Figure 3:
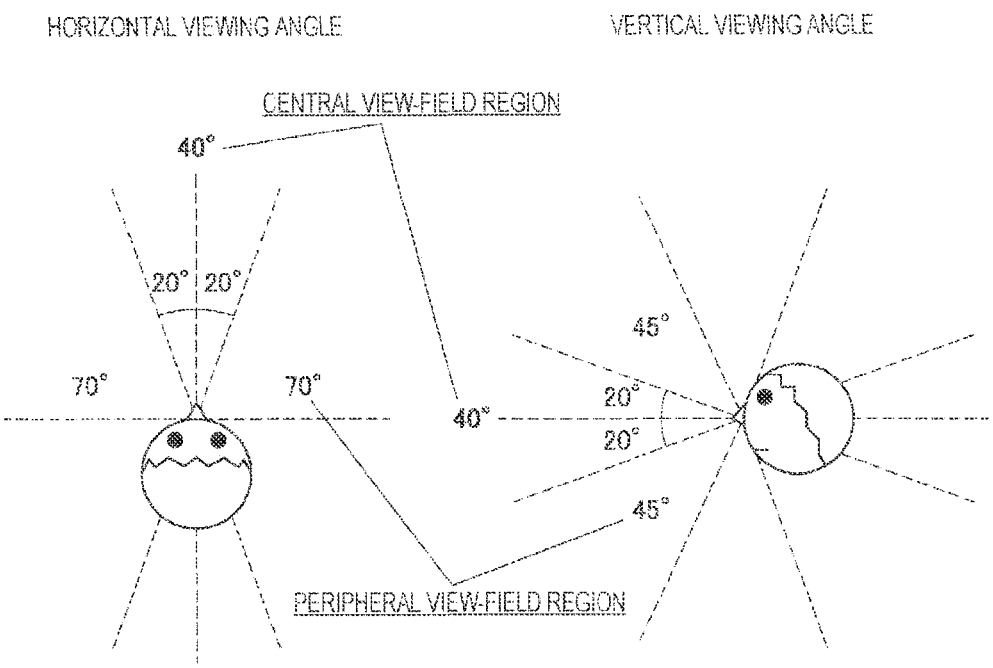
FIG. 3 is an explanatory view illustrating a central view-field region and a peripheral view-field region.

The field of view of a person has a central view-field region and a peripheral view-field region. FIG. 3 is an explanatory view illustrating the central view-field region and the peripheral view-field region. The central view-field region is a region which a person focuses on, and the person can accurately grasp colors and shapes in the region. The central view-field region has a high resolution that can be recognized by a human. In contrast, the peripheral view-field region is placed outside the central view-field region. In the peripheral view-field region, motion in a wide range and a position are grasped. The peripheral view-field region has little connection with a photoreceptor cell, and low resolution that can be recognized.

Generally, the FOV of the central view field is approximately 40 degrees, and the rest can be considered as the peripheral view field. That is, a high-resolution video with high ppi is displayed only in the central view-field region where a human can recognize high resolution (i.e., central view-field region has a small and fine pixel size). A low-resolution video with low ppi is displayed in the peripheral view field with low resolution (i.e., large and coarse pixel size). Such display enables a person to recognize a video as a very natural and high-resolution video.

Figure 4:
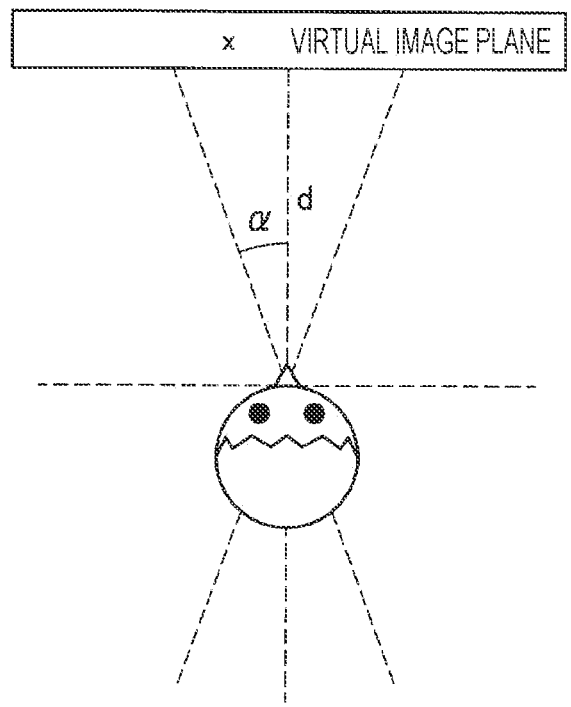
FIG. 4 is an explanatory view illustrating the relation between a viewing angle and the size of a video (virtual image displayed on a virtual image plane).
Figure 5:
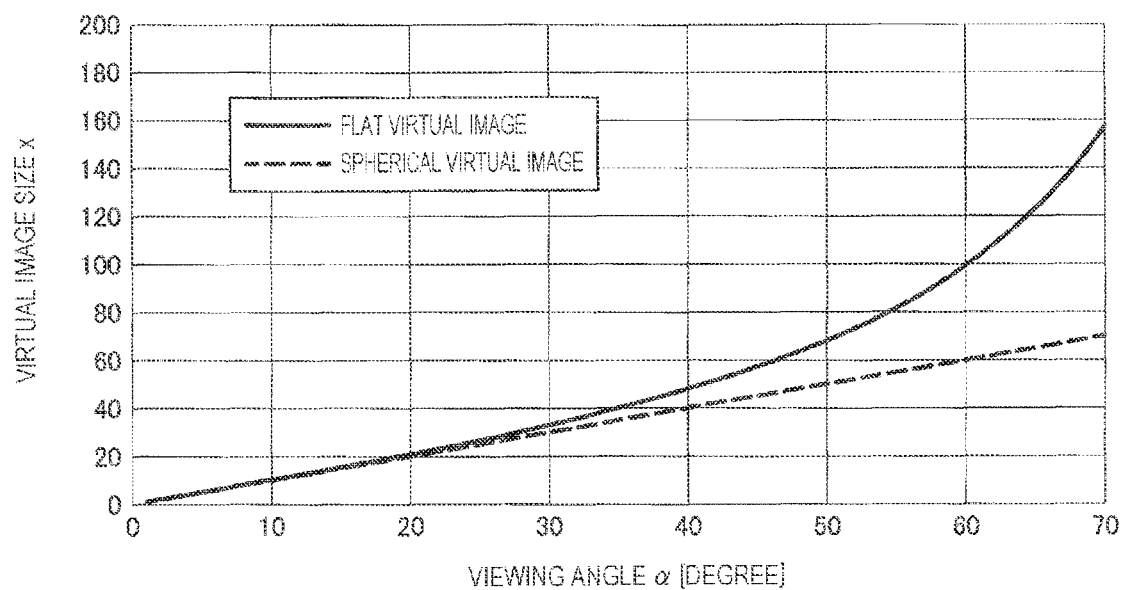
FIG. 5 is an explanatory graph illustrating the relation between a viewing angle and the size of a video (virtual image displayed on a virtual image plane).

FIG. 4 is an explanatory view illustrating the relation between a viewing angle and the size of a video (virtual image displayed on a virtual image plane). Furthermore, FIG. 5 is an explanatory graph illustrating the relation between a viewing angle and the size of a video (virtual image displayed on a virtual image plane). If a displayed region, a viewing distance, and a viewing angle are defined as x, d, and α, respectively, $x = d*\tan(\alpha)$ is defined. In a case of a normal flat display, a viewing angle and a display area size have the relation of a function of tangent. For example, if the maximum FOV and the central view-field region are defined as 100 degrees (50 degrees on one side) and 40 degrees (20 degrees on one side), respectively, the central view-field region corresponds to approximately 30% of the entire region.

Figure 6:
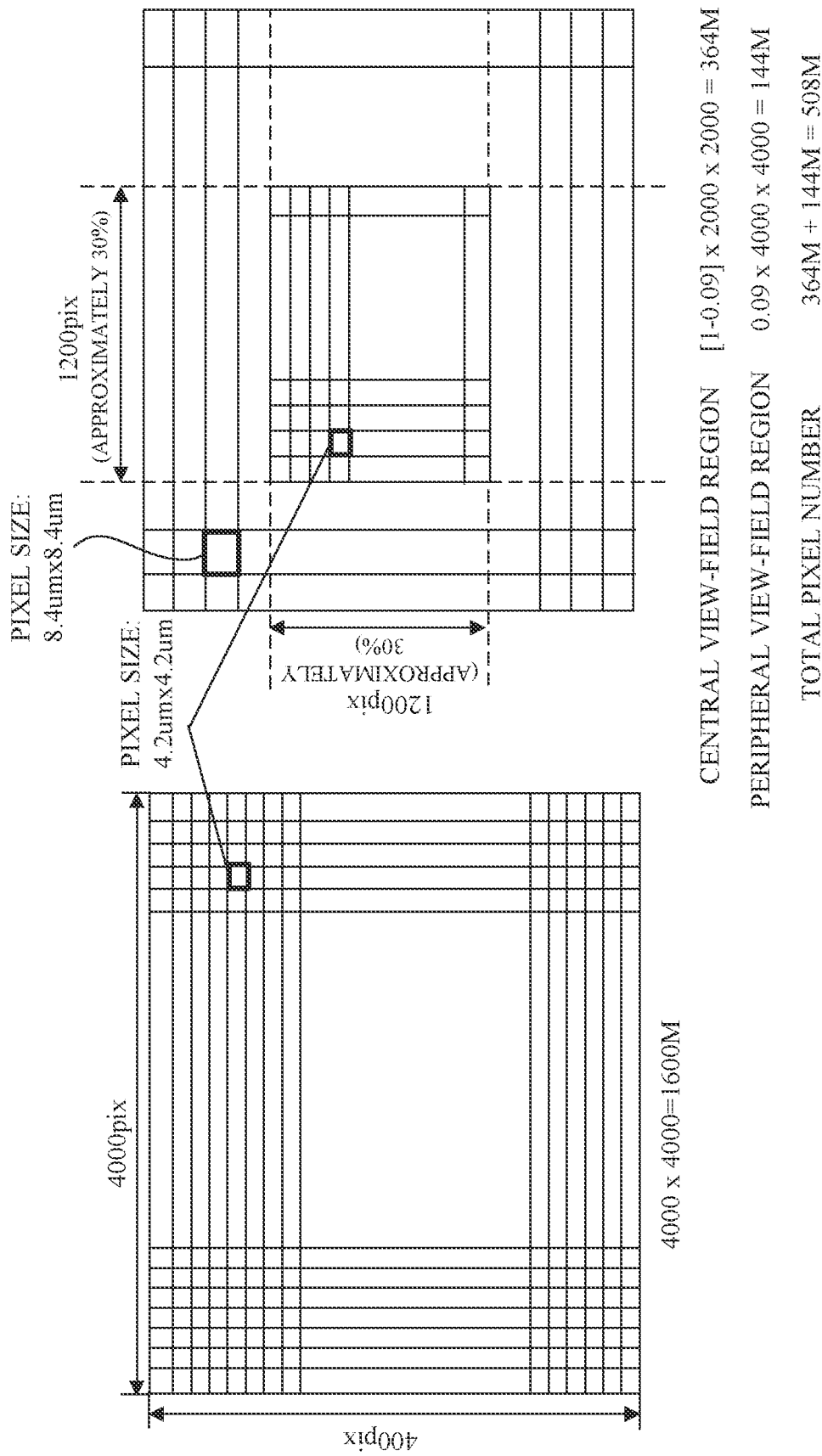
FIG. 6 is an explanatory view illustrating the pixel number of a display.

Suppose a micro display has the specifications of a size of one inch, an aspect of 1:1, and the maximum FOV of 100 degrees. FIG. 6 is an explanatory view illustrating the total pixel number in a case where the central view-field region with an FOV of 40 degrees and the peripheral view-field region of 100 degrees are displayed in pixel sizes of 4 k×4 k equivalent (approximately 4.2 um) and 2 k×2 k equivalent (approximately 8.3 um), respectively, in a display with such specifications. In the display with the above-described specifications, the total pixel number is (1−0.09)*(2 k×2 k)+0.09*(4 k×4 k)=approximately 5 million.

In contrast, in a case where all regions are driven at a uniform resolution of 4 k×4 k, the pixel number is approximately 16 million. Consequently, if the central view-field region and the peripheral view-field region of 100 degrees are displayed in pixel sizes of 4 k×4 k equivalent (approximately 4.2 um) and 2 k×2 k equivalent (approximately 8.3 um), respectively, the pixel number can actually be compressed to approximately 70% compared to that in a case where all regions are displayed at a uniform resolution of 4 k×4 k. A system of 2.5 k×2.5 k or less can drive the display panel, and inevitably a 4 k×2 k system, which is currently becoming mainstream, can sufficiently drive the display panel.

Consequently, the display system according to the embodiment of the disclosure prepares at least two display modes having different display resolutions. Then, the display system according to the embodiment of the disclosure performs display in a display mode (first display mode) for displaying a high-resolution image in a region in an image, for example, the central view-field region. The display system performs display in a display mode (second display mode) with a resolution lower than that of the first display mode in another region, for example, the peripheral view-field region. The display system according to the embodiment of the disclosure prepares at least two display modes having such different display resolutions, and performs display in display modes different in accordance with regions, so that the display system can display a high-quality image while inhibiting a load at the time of displaying the image in front of a user. Note that, although, in the embodiment, the first display mode has a resolution higher than that of the second display mode, the disclosure is not limited to the example. For example, the first and second display modes may have the same resolution.

Figure 7:
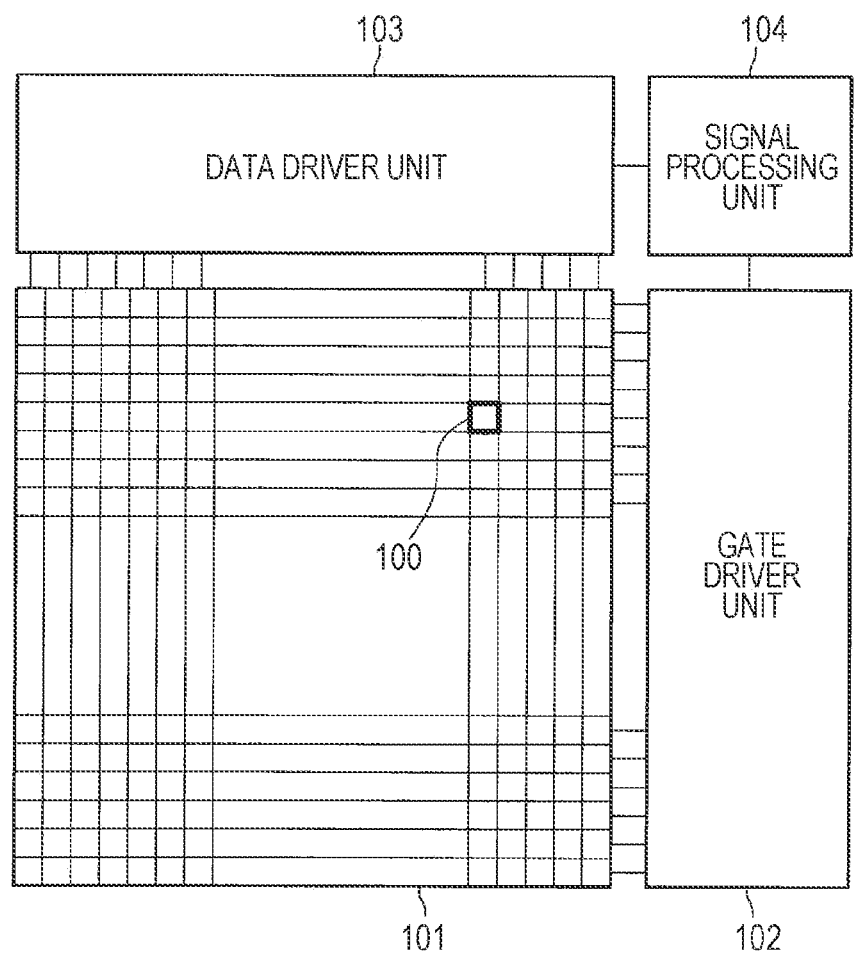
FIG. 7 is an explanatory view illustrating a configuration example of a display system according to the embodiment of the disclosure.

FIG. 7 is an explanatory view illustrating a configuration example of the display system according to the embodiment of the disclosure. An object of the display system in FIG. 7 is to display an image or the like in front of a user. Such a display system includes a display system used for, for example, a head mounted display and the like and a display system used for a head mounted display and the like for allowing a user to experience virtual reality (VR) and augmented reality (AR).

As illustrated in FIG. 7, the display system according to the embodiment of the disclosure includes a panel unit 101, a gate driver unit 102, a data driver unit 103, and a signal processing unit 104. In the panel unit 101, pixels 100, which express the central view-field region and have an original pixel size, are spread over the entire region. The gate driver unit 102 drives a vertical scanning line. The data driver unit 103 gives a signal in a horizontal direction. The signal processing unit 104 determines the size of a pixel to be displayed.

The panel unit 101 is driven by an active matrix driving method. All pixels of the panel unit 101 are connected to the gate driver unit 102 and the data driver unit 103.

The signal processing unit 104 includes, for example, any processor, for example, a graphic processor. The signal processing unit 104 gives any control signal for causing the gate driver unit 102 and the data driver unit 103 to drive the panel unit 101. Particularly in the embodiment, as described above, the signal processing unit 104 processes a signal processing for performing display in a display mode (first display mode) for displaying a high-resolution image in a region of the panel unit 101, for example, the central view-field region, and for performing display in a display mode (second display mode) with a resolution lower than that of the first display mode in another region of the panel unit 101, for example, the peripheral view-field region.

Figure 8:
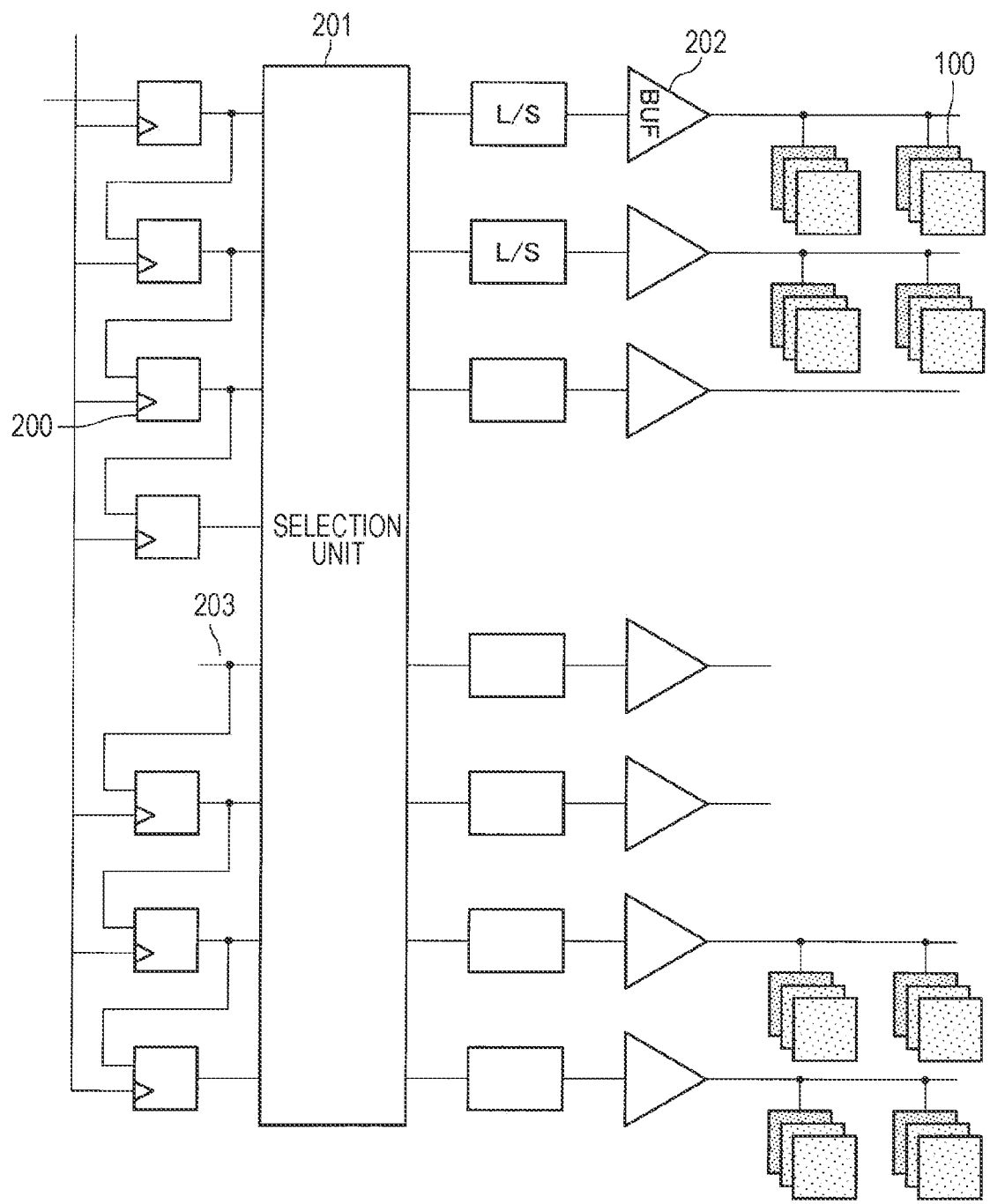
FIG. 8 is an explanatory view illustrating a configuration example of a gate driver unit 102.

FIG. 8 is an explanatory view illustrating a configuration example of the gate driver unit 102. As illustrated in FIG. 8, the gate driver unit 102 includes a scanner unit 200, a selection unit 201, and a buffer unit 202. The scanner unit 200 sequentially transfers a vertical writing signal. The selection unit 201 selects any signal from sequentially transferred vertical writing signal. The buffer unit 202 performs impedance conversion from the writing signal to a signal to be written to a pixel. The scanner unit 200 transmits a signal to the selection unit 201 through an output node 203.

Figure 9:
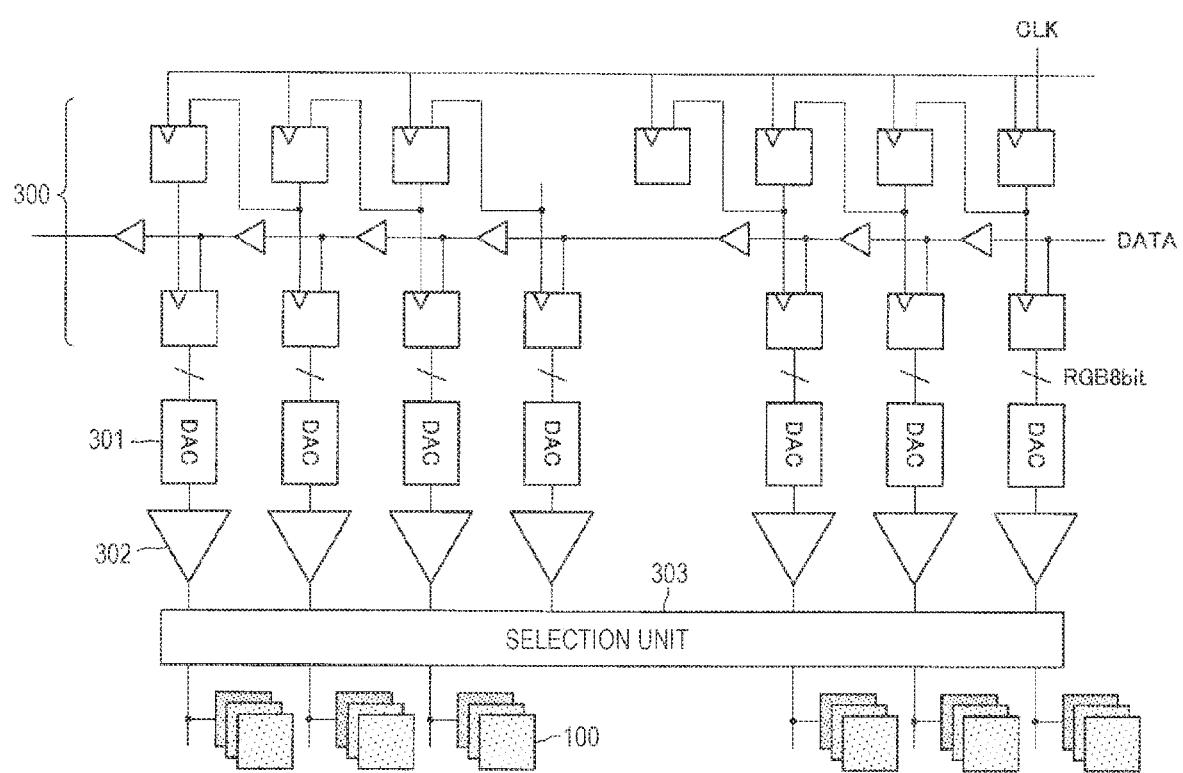
FIG. 9 is an explanatory view illustrating a configuration example of a data driver unit 103.

FIG. 9 is an explanatory view illustrating a configuration example of the data driver unit 103. As illustrated in FIG. 9, the data driver unit 103 includes a scanner unit 300, a DAC unit 301, an AMP unit 302, and a selection unit 303. The scanner unit 300 transfers data to be written within a horizontal period. The DAC unit 301 converts a digital signal to an analog signal. The AMP unit 302 writes an analog voltage to a pixel. The selection unit 303 selects a data line to be written.

The display system according to the embodiment of the disclosure can optionally change a pixel size in the same panel by inputting any control signal from the signal processing unit 104 to each of the selection unit 201 in FIG. 8 and the selection unit 303 in FIG. 9 and simultaneously driving a plurality of lines of a gate signal line and a data signal line.

Figure 10:
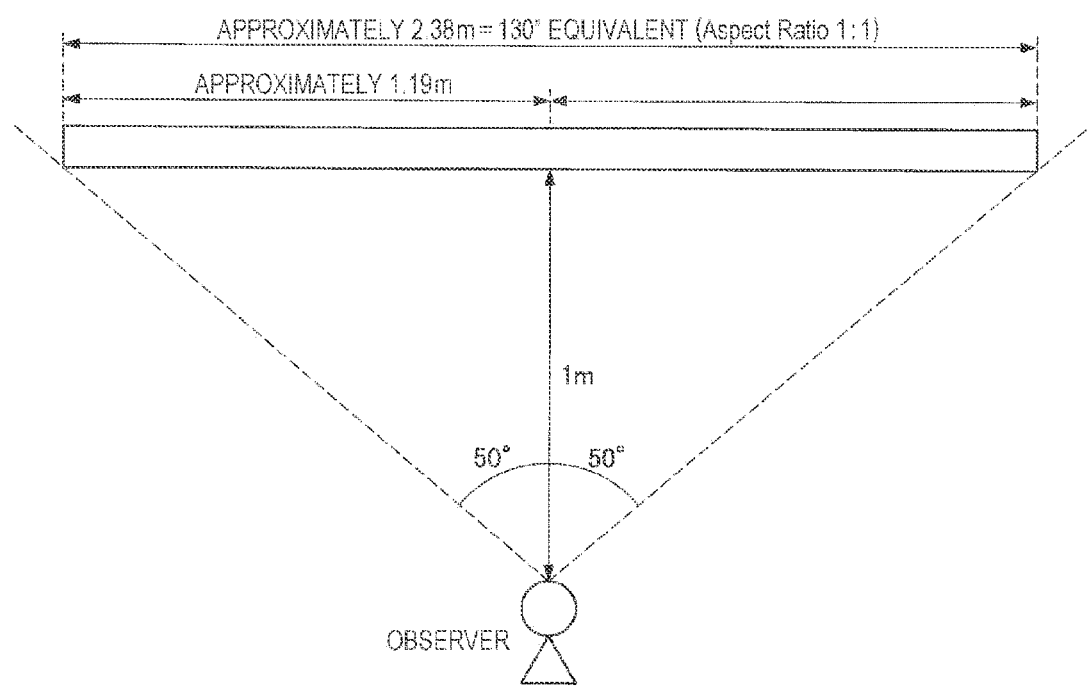
FIG. 10 is an explanatory view for illustrating the processing of generating a pixel size control signal performed by a signal processing unit 104.

Here, processing of generating a pixel size control signal performed by the signal processing unit 104 will be described. FIG. 10 is an explanatory view for illustrating the processing of generating a pixel size control signal performed by the signal processing unit 104. The signal processing unit 104 first determines an area to be displayed in an original pixel size. The original pixel size is the size of the pixel 100 in FIG. 7, that is, the minimum size of pixels spread over the entire panel unit 101. Furthermore, the display system according to the embodiment has an aspect of 1:1, and can perform display up to vertical and horizontal viewing angles of F0. Furthermore, for simplicity of description, F0=100° is assumed.

In determining an area to be displayed in the original pixel size, the signal processing unit 104 determines a pixel magnification from the display origin (0,0) in FIG. 10 to vertical and horizontal viewing angles. The signal processing unit 104 first determines a central viewing angle f. The range of f can be set from 0° to F0. Normally, the central viewing angle is approximately 40°, and thus the signal processing unit 104 sets the central viewing angle at 40° here.

Next, the signal processing unit 104 sets display so that the pixel size is increased toward the outer periphery. Although various methods of setting are conceivable, in the embodiment, a method of approximation by using a function is adopted. For example, in the embodiment, a case where a pixel size is set by using a quadratic function is considered. Furthermore, the pixel size at the outermost periphery is set to m. The pixel size m means that the vertical and horizontal lengths are displayed to be m times larger than those of the original pixel. For example, if m=4 is set, the length of one side is quadrupled, so that the pixel size is increased by sixteen times.

The outermost periphery here means a region at the viewing angle F0 (=100%). The signal processing unit 104 interpolates the viewing angle from f to F0 by using a quadratic function. If y is the magnification of a pixel size and x is a viewing angle equal to or larger than the central view field, in a case of performing fitting with $y=ax^2+bx+c$, the fitting curve of a magnification can be obtained by solving $m=a*((F0-f)/2)^2+b*(F0-f)/2+c$. Suppose m=4, F0=100, and f=40, $y=2e-3*x^2+4e-2*x+1$ holds.

Actually, the pixel size can have only an integer value. Consequently, the magnification×in each view-field region has a discrete value. The signal processing unit 104 performs the interpolation processing in the vertical and horizontal directions to create a two-dimensional matrix of a pixel size and coordinates.

Figure 11:
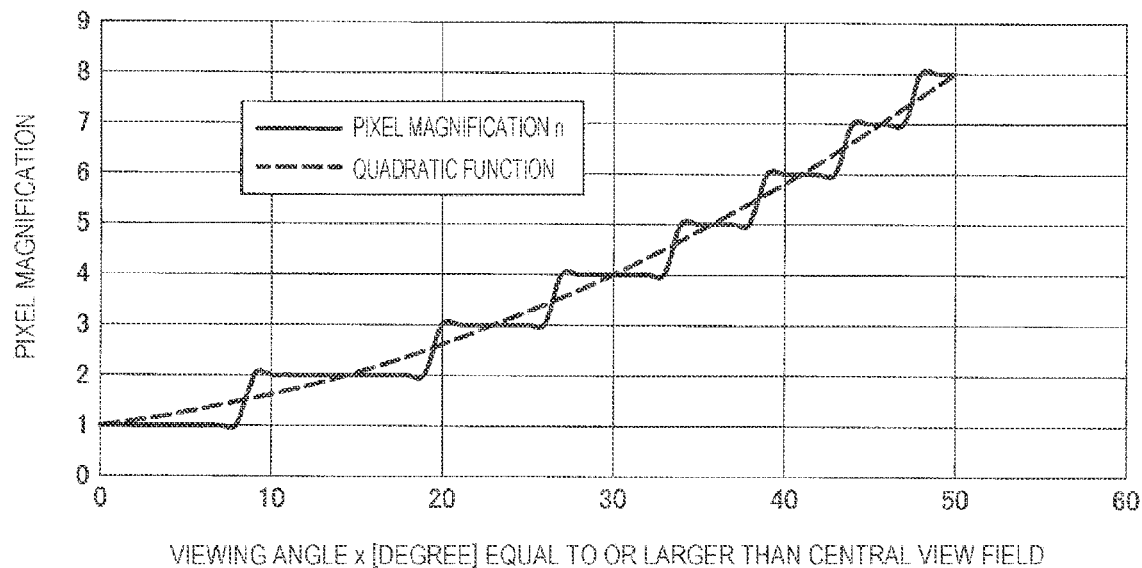
FIG. 11 is an explanatory graph illustrating the relation between a viewing angle equal to or larger than a central view field and a pixel magnification.
Figures 12B, 13:
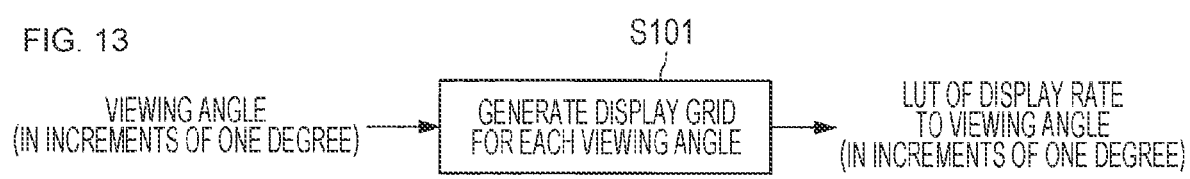
FIG. 12B is an explanatory table illustrating the relation between a viewing angle and a pixel magnification.
FIG. 13 is an explanatory view illustrating the operation of the signal processing unit 104.

FIG. 11 is an explanatory graph illustrating the relation between the viewing angle equal to or larger than the central view field and the pixel magnification. FIGS. 12A and 12B are explanatory tables illustrating the relation between a viewing angle and a pixel magnification. In the example, the original pixel size is used in a viewing angle region within 56° (±28°) from the center, and the magnification of the pixel size is one time. The viewing angle region larger than 56° and equal to or less than 78° has one side whose length is doubled, the pixel size is quadrupled. Furthermore, the viewing angle region larger than 78° and equal to or less than 92° has one side whose length is tripled, the pixel size is increased by nine times. Moreover, the viewing angle region larger than 92° and equal to or less than 100° has one side whose length is quadrupled, the pixel size is increased by sixteen times. The signal processing unit 104 can determine the magnification of a pixel size to a viewing angle by performing such processing.

Next, the signal processing unit 104 generates the number of simultaneously driven lines of the gate signal line from the gate driver unit 102 to the panel unit 101 and the data signal line from the data driver unit 103 to the panel unit 101.

First, the signal processing unit 104 generates a display grid for each viewing angle. FIG. 13 is an explanatory view illustrating the operation of the signal processing unit 104. The signal processing unit 104 generates the display grid for each viewing angle on the basis of the viewing angle in increments of one degree (Step S101). The generated display grid for each viewing angle is stored in a look-up table (LUT) of a display rate to a viewing angle.

Figure 14:
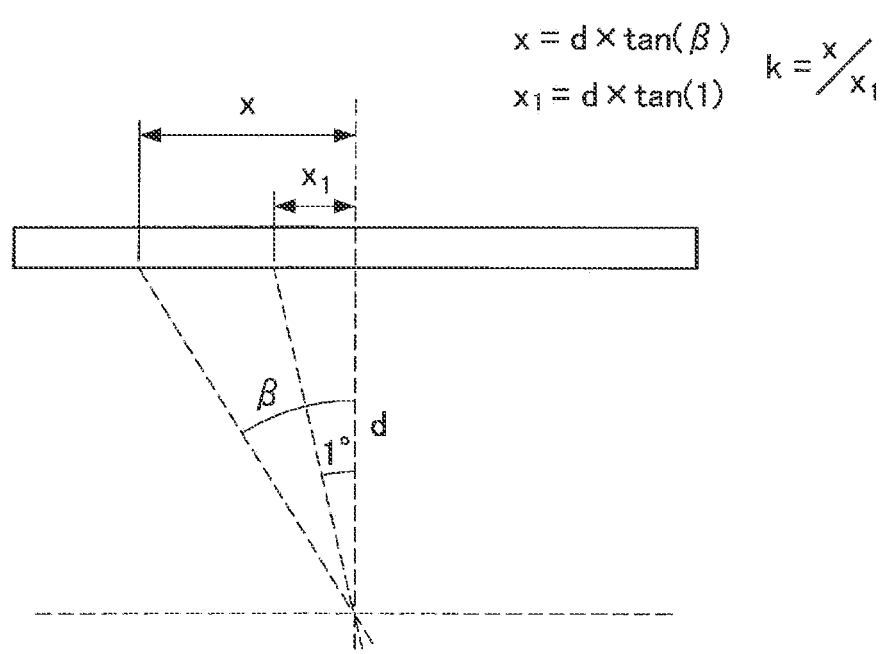
FIG. 14 is an explanatory view illustrating a display grid for each viewing angle.

FIG. 14 is an explanatory view illustrating a display grid for each viewing angle. β, x, $x_1$, and k are defined as a viewing angle, a display region of any viewing angle, a display region of a viewing angle of one degree, and the rate of the display region to an area of one degree, respectively. The signal processing unit 104 generates an LUT that stores the value of k in accordance with each viewing angle. The value of k is obtained by the following expression.

$x=d*\tan(\beta)$, $x_1=d*\tan(1)$, and $k=x/x1$ FIGS. 15A and 15B are explanatory views illustrating values, determined by the above expression, stored in the look-up table of a display rate to a viewing angle.

For example, in a case of β=10, the value of k is approximately 10, which is approximately ten times the value of k in a case of β=1. That is, in a case of β=10, a region approximately 10 times as large as that in a case of β=1 is required. In a case of β=40, the value of k is approximately 48, which is approximately 48 times the value of k in a case of β=1. In a case of β=40, a region approximately 48 times as large as that in a case of β=1 is required. That is, it can be seen that a display displaying area for expressing each viewing angle is not linear but has any reach.

Figure 16:
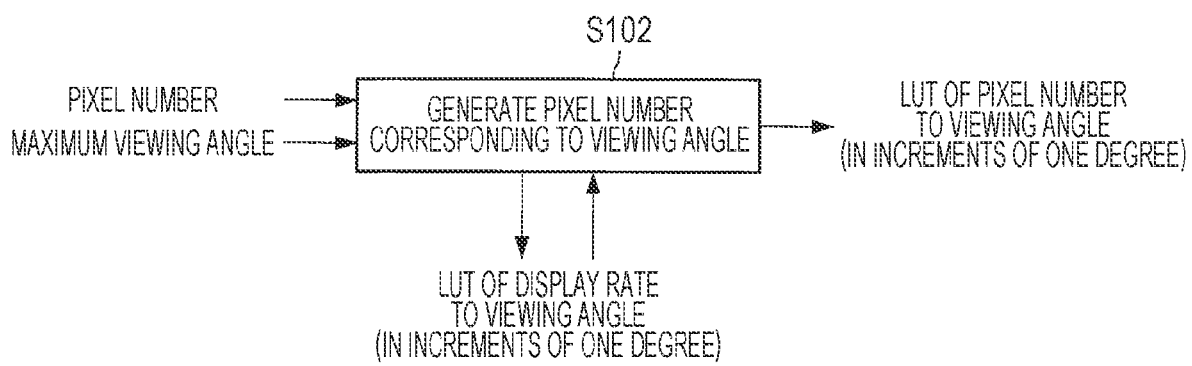
FIG. 16 is an explanatory view illustrating the operation of the signal processing unit 104.

Next, the signal processing unit 104 generates the pixel number for the viewing angle (in increments of one degree). FIG. 16 is an explanatory view illustrating the operation of the signal processing unit 104. The signal processing unit 104 generates a pixel number p by using a pixel number ($p_0$) and a maximum viewing angle ($x_m$) as input values (Step S102). The pixel number p is given from the expressions $k_m=x_m/x_1$ and $p=p_0*k/km$. The character p corresponds to the viewing angle (in increments of one degree). The signal processing unit 104 creates an LUT that stores the generated pixel number p in accordance with each viewing angle. Here, $k_m$ is the rate of the display region at the time of the maximum viewing angle, and p is the pixel number in accordance with viewing angle (in increments of one degree). FIGS. 17A and 17B are explanatory views illustrating values of the pixel number to the viewing angle. The values are determined in the above expression, and stored in the look-up table.

For example, the case of the original pixel number of 4000×4000 and the maximum viewing angle of 100 degrees will be considered as the pixel number. Half the horizontal resolution is input as a pixel number $p_0$ of an input value, and thus $p_0$=2000 holds. Furthermore, 50 degrees, which is half the maximum viewing angle, are input as an input value. A value of $k_m=x_m/x_1=x(50)/x_1$=approximately 68 is calculated from the LUT. As a result, the pixel number corresponding to each viewing angle is obtained as illustrated in FIGS. 17A and 17B. For example, it can be seen that a viewing angle of 20 to 21 degrees is expressed by 611 to 644 (pixel number 33 pixels).

Figure 18:
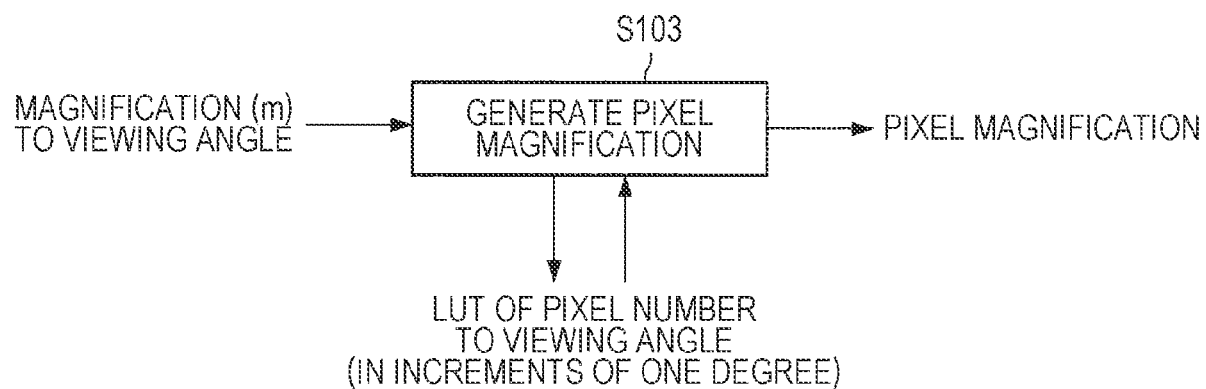
FIG. 18 is an explanatory view illustrating the operation of the signal processing unit 104.

Next, the signal processing unit 104 generates a magnification for each pixel. FIG. 18 is an explanatory view illustrating the operation of the signal processing unit 104. The signal processing unit 104 creates an LUT in which a pixel magnification value for each viewing angle is preliminarily stored. Consequently, the signal processing unit 104 generates a look-up table corresponding to the look-up table of the pixel number in FIGS. 17A and 17B (Step S103). FIGS. 19A and 19B are explanatory views illustrating values, stored in the look-up table, of a magnification to a pixel.

Referring to the look-up tables in FIGS. 19A and 19B, for example, pixels 0 to 892 has a magnification of one, and original pixels are displayed for the pixels. Pixels 893 to 1359 has a magnification of two, and the pixels are displayed in four times the size of the original pixel. The look-up table is the final output result of the signal processing unit 104, and determines the number of simultaneously driven lines of a gate and data. For example, if m=4, four lines are simultaneously driven. Then, a simultaneously driven line number array of each gate and a signal line is created from each gate, a signal line, and an array of m.

Figure 20:
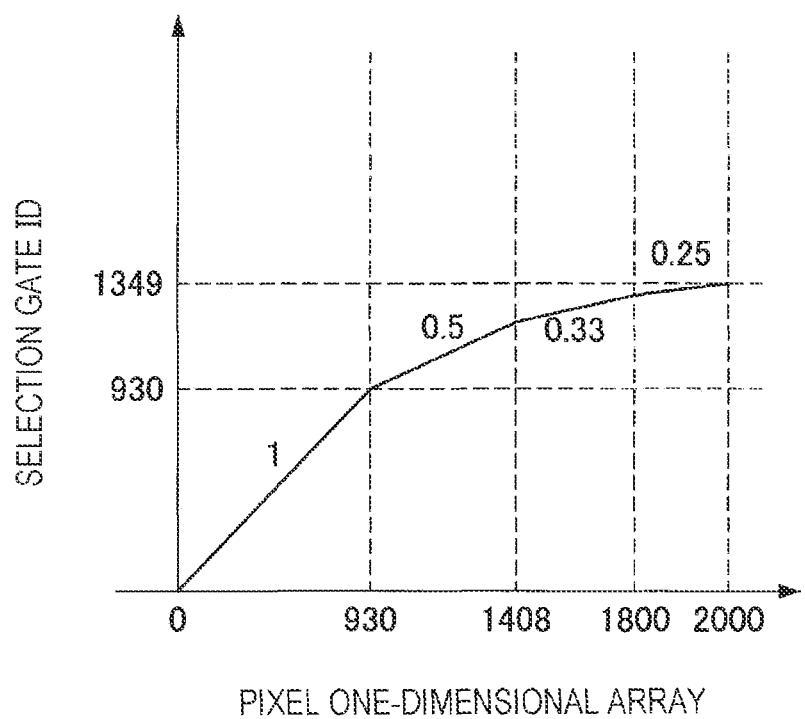
FIG. 20 is an explanatory view illustrating an ID of a selection gate actually generated by the signal processing unit 104.

The signal processing unit 104 transfers the generated control signal of the simultaneously driven line number to the gate driver unit 102 and the data driver unit 103. FIG. 20 is an explanatory view illustrating an ID of a selection gate actually generated by the signal processing unit 104. Furthermore, FIGS. 21A and 21B are explanatory tables illustrating a selection gate ID for each viewing angle and a value obtained by representing each selection gate ID at 12 bits. In the example in FIG. 20, change of m=2, 3, and 4 occurs at magnification breakpoint pixels pi=930, 1408, and 1800, respectively. Selection data of each gate is calculated by changing the inclination of increment in accordance with the breakpoint.

Figure 22:
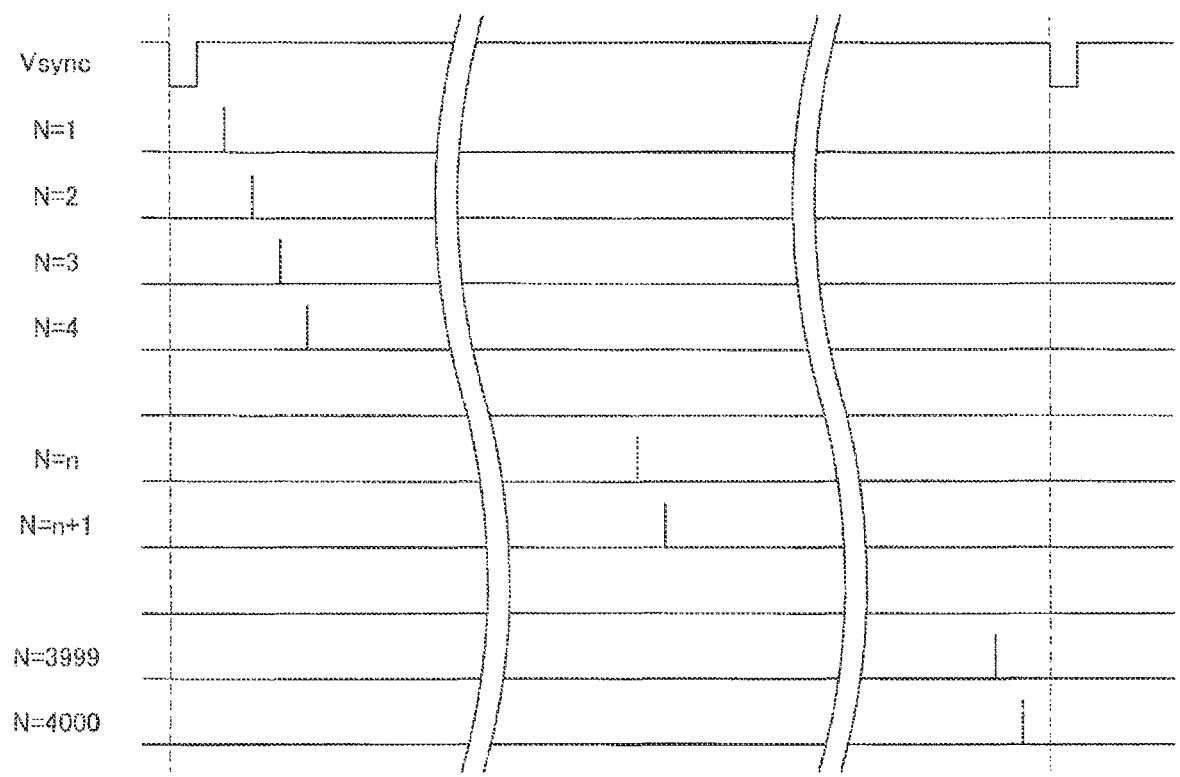
FIG. 22 is an explanatory view illustrating output timing for each row.

The scanner unit 200 inside the gate driver unit 102 is a scanner circuit including a flip-flop, and performs transfer all the vertical pixel number per 1 H (horizontal cycle). Assuming that the resolution obtained by spreading the original pixel sizes over the entire surface is equivalent to 4k×4k, the vertical pixel number is approximately 4000, and 4000 output signals are output from the scanner unit 200. The timing of each output is shifted every 1 H, and the timing of 4000th line is delayed by 4000 H from that of the first line. FIG. 22 is an explanatory view illustrating output timing for each row in a case where the vertical pixel number is approximately 4000. The selection unit 201 selects any output from the 4000 output signals.

Figure 23:
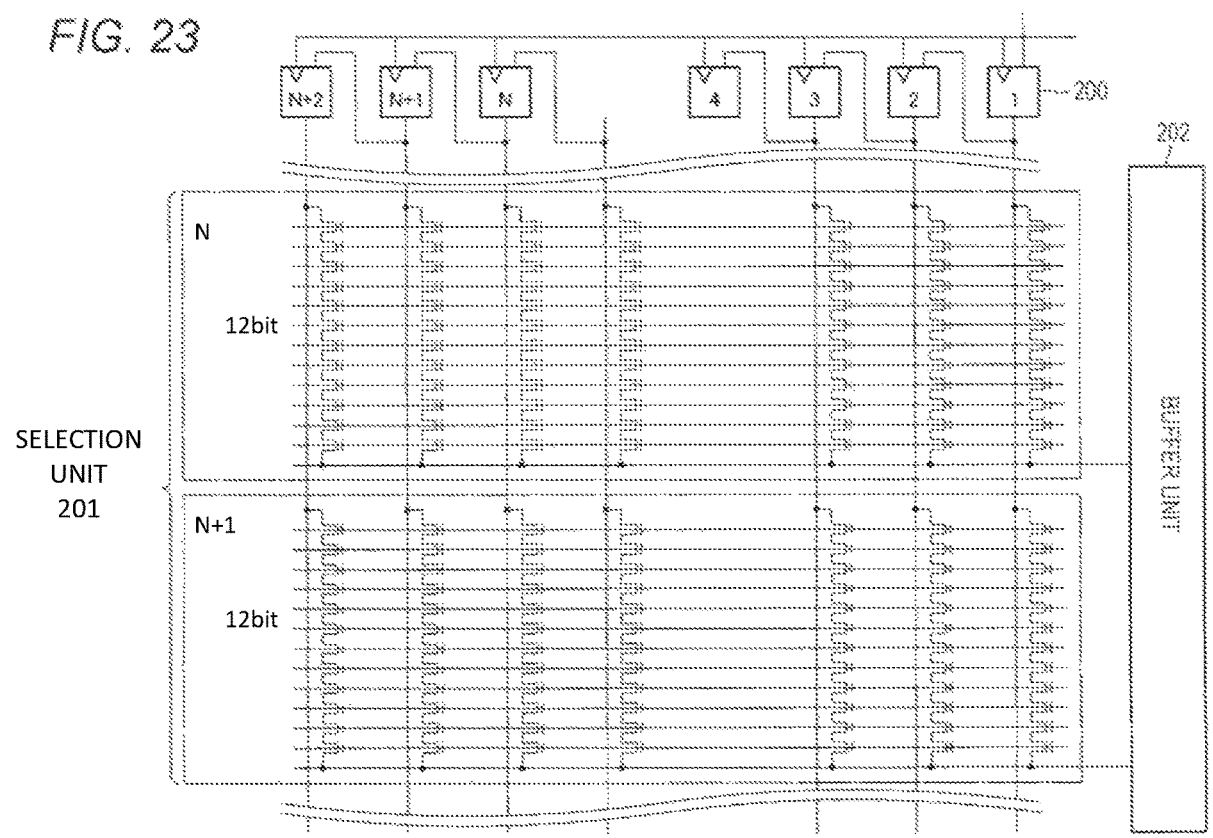
FIG. 23 is an explanatory view illustrating an example of a circuit configuration of the selection unit 201.

The number of 4000 can be expressed by at least 12 bits. This is because 12 bits can express 4096 values from 0 to 4095. Consequently, the selection unit 201 operates on the basis of a 12-bit signal output from a 12-bit DAC. That is, the selection unit 201 includes 12 stages of transistors. FIG. 23 is an explanatory view illustrating an example of a circuit configuration of the selection unit 201. In the embodiment, the selection unit 201 includes 12 stages of transistors for each row. Needless to say, the number of transistors used in the selection unit 201 can be reduced from the 12 stages by combination with a logic circuit.

Figure 24:
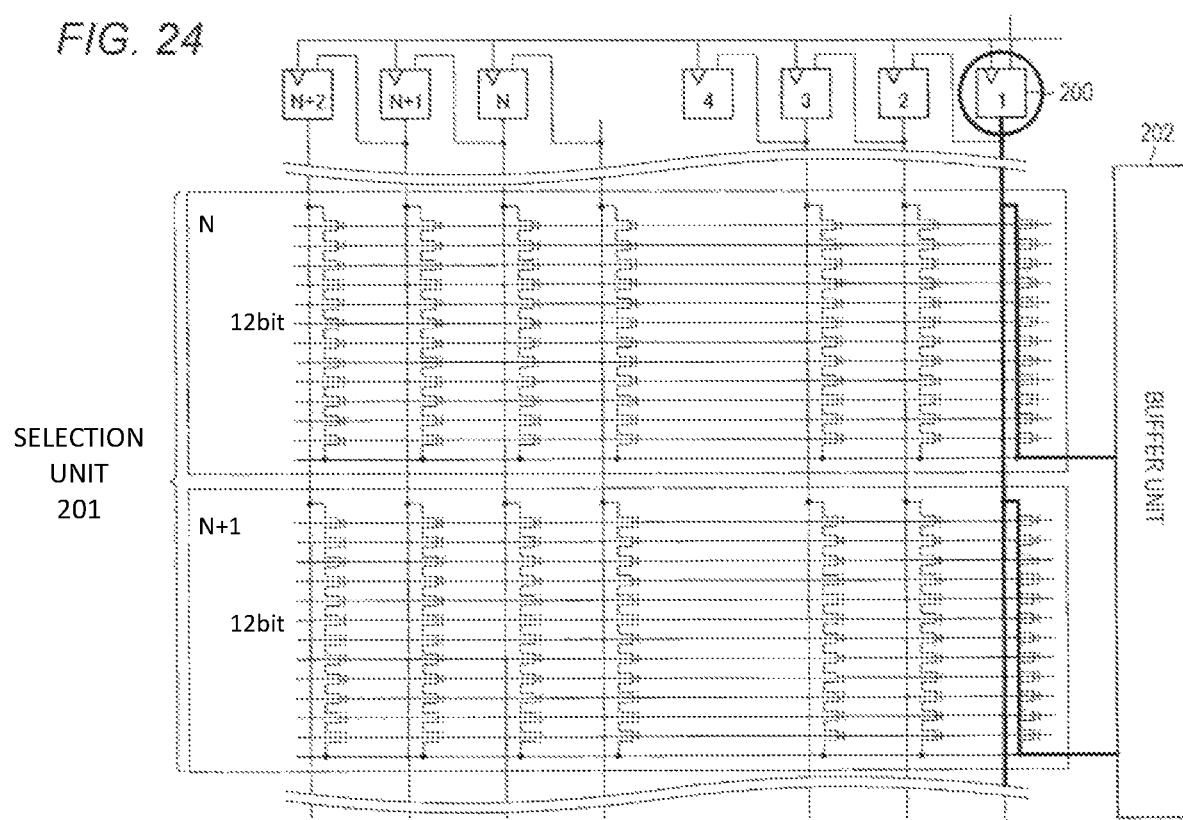
FIG. 24 is an explanatory view illustrating the operation of the selection unit 201.

The selection unit 201 selects timing of input to the buffer unit 202. For example, in a case where the control signal input to the selection unit 201 of all lines is [000000000000], all the lines select the timing of the 1st H, and thus all pixels are simultaneously driven. FIG. 24 is an explanatory view illustrating the operation of the selection unit 201 in a case where the control signal is [000000000000].

Figure 25:
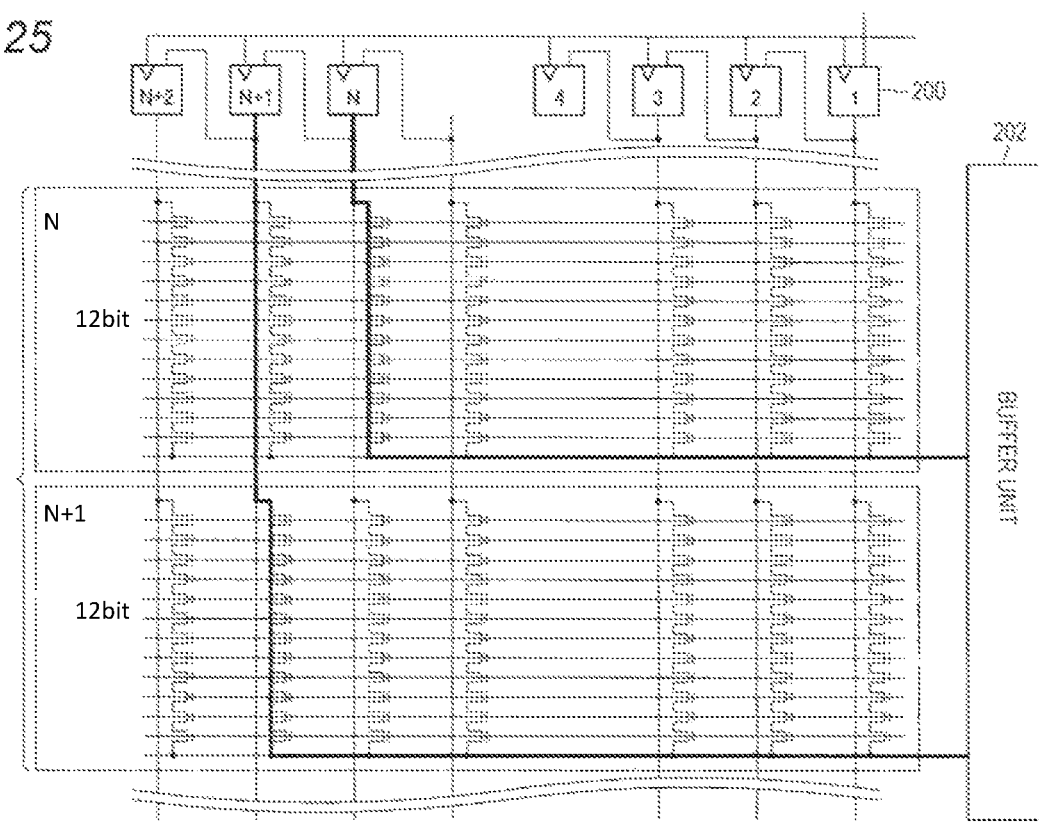
FIG. 25 is an explanatory view illustrating the operation in a case where a control signal incremented by one bit is input to the selection unit 201.

Furthermore, in a case where a control signal incremented by one bit from [000000000000] to [111111111111] is input to the selection unit 201, the panel unit 101 is driven in a normal active matrix driving in which scanning is performed every 1 H. FIG. 25 is an explanatory view illustrating the operation in a case where a control signal incremented by one bit is input to the selection unit 201. If a control signal incremented by one bit is input to the selection unit 201 in this way, the panel unit 101 is driven in the active matrix driving.

The scanner unit 300 inside the data driver unit 103 transfers digital data to be written to each pixel while transferring a clock. Data of horizontal resolution generated by the signal processing unit 104 is transferred to each pixel. Assuming that the resolution obtained by spreading the original pixel sizes over the entire surface is equivalent to 4k×4k, the original horizontal pixel number is approximately 4000. In a case where the central view-field region is 40° with respect to a horizontal FOV of 100°, the outermost periphery is m=4, and a pixel size magnification is fitted by a quadratic function, the horizontal resolution is 4000 (56/100)+2000×(22/100)+1333×(14/100)+1000×(8/100)=Approximately 2950 pixels.

Consequently, the horizontal pixel number is compressed to approximately 73%.

Figure 26:
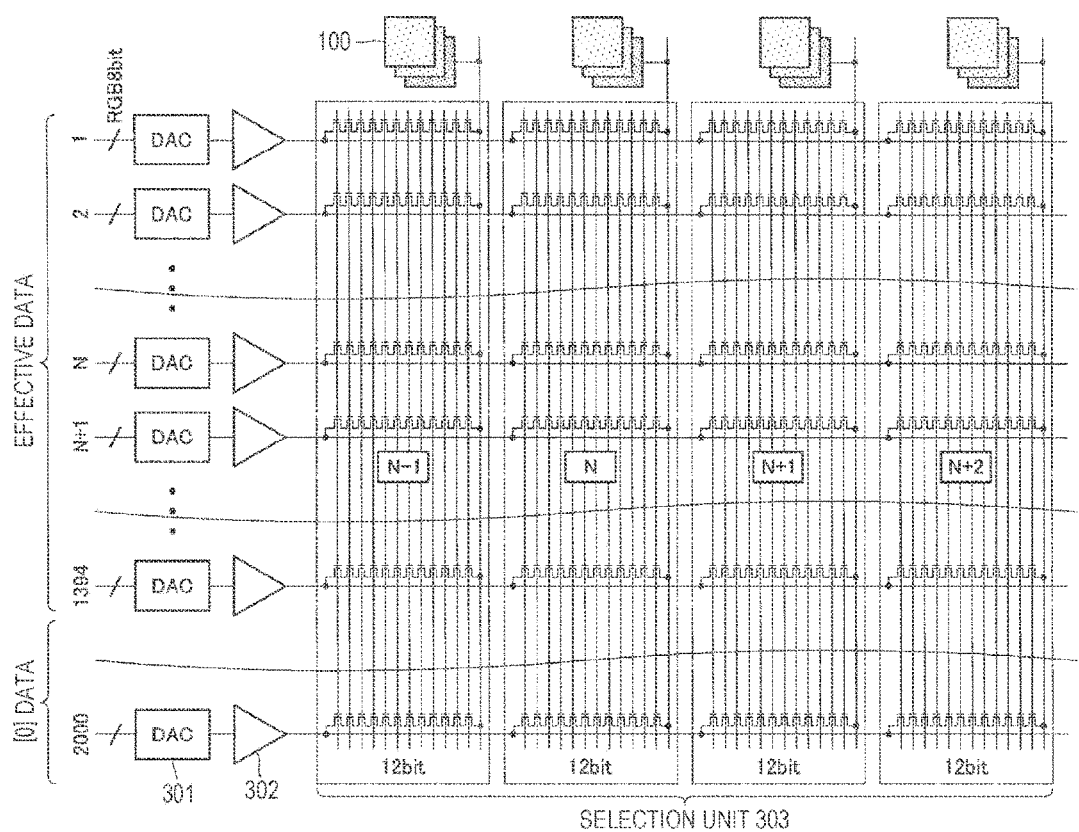
FIG. 26 is an explanatory view illustrating configuration examples of a DAC unit 301, an AMP unit 302, and a selection unit 303.

The scanner unit 300 transfers video data of effective 2950 pixels+black insertion 1050 pixels=4000 pixels. FIG. 26 is an explanatory view illustrating configuration examples of the DAC unit 301, the AMP unit 302, and the selection unit 303. In FIG. 26, the viewing angle of 0 degrees is centered, and only the left side is illustrated. That is, only 2000 pixels are illustrated in FIG. 26.

The scanner unit 300 outputs video data of 4000 pixels. The data is received, and horizontal direction data is output through the DAC unit 301 and the AMP unit 302. The selection unit 303 selects any output from the 4000 output signals.

Figure 27:
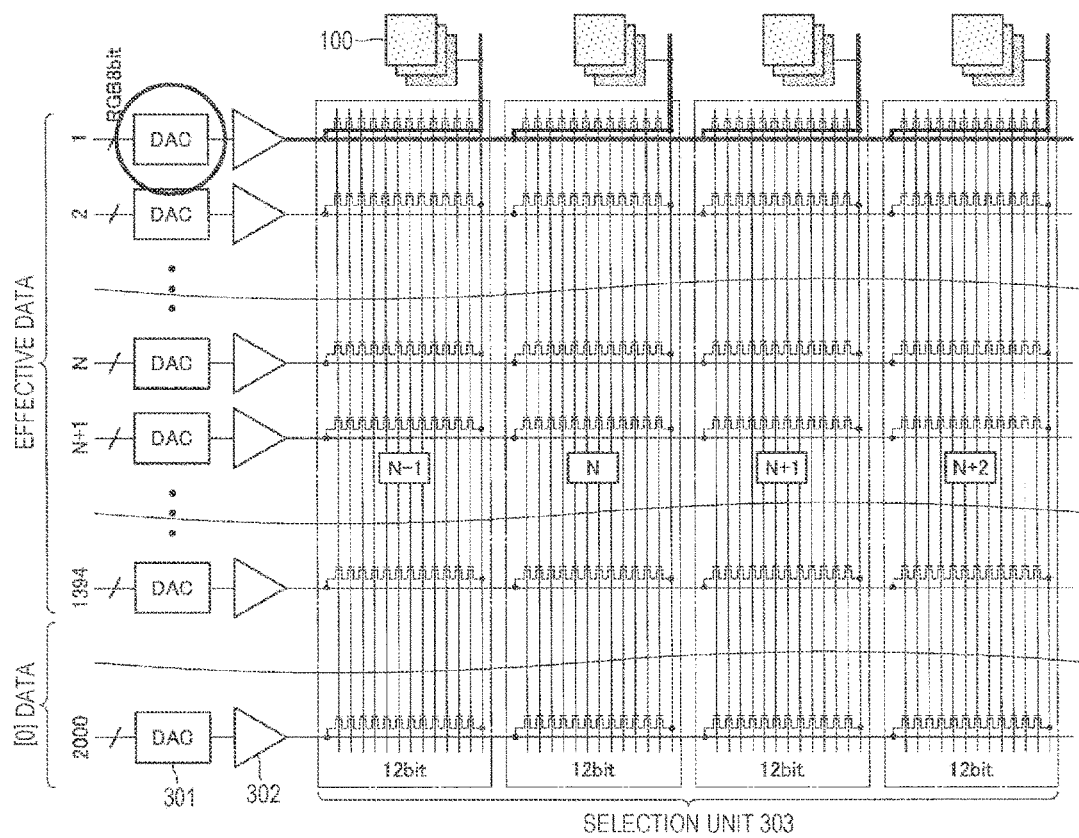
FIG. 27 is an explanatory view illustrating the operation of the selection unit 303.

Similarly to the gate driver unit 102, the number of 4000 can be expressed by 12 bits. The selection unit 303 includes 12 stages of transistors, and selects analog data to be input to a signal line. For example, in a case where the control signal input to the selection unit 303 of all lines is [000000000000], all the lines select 0th data, and thus all pixels are simultaneously driven by the same data. FIG. 27 is an explanatory view illustrating the operation of the selection unit 303 in a case where the control signal is [000000000000].

Figure 28:
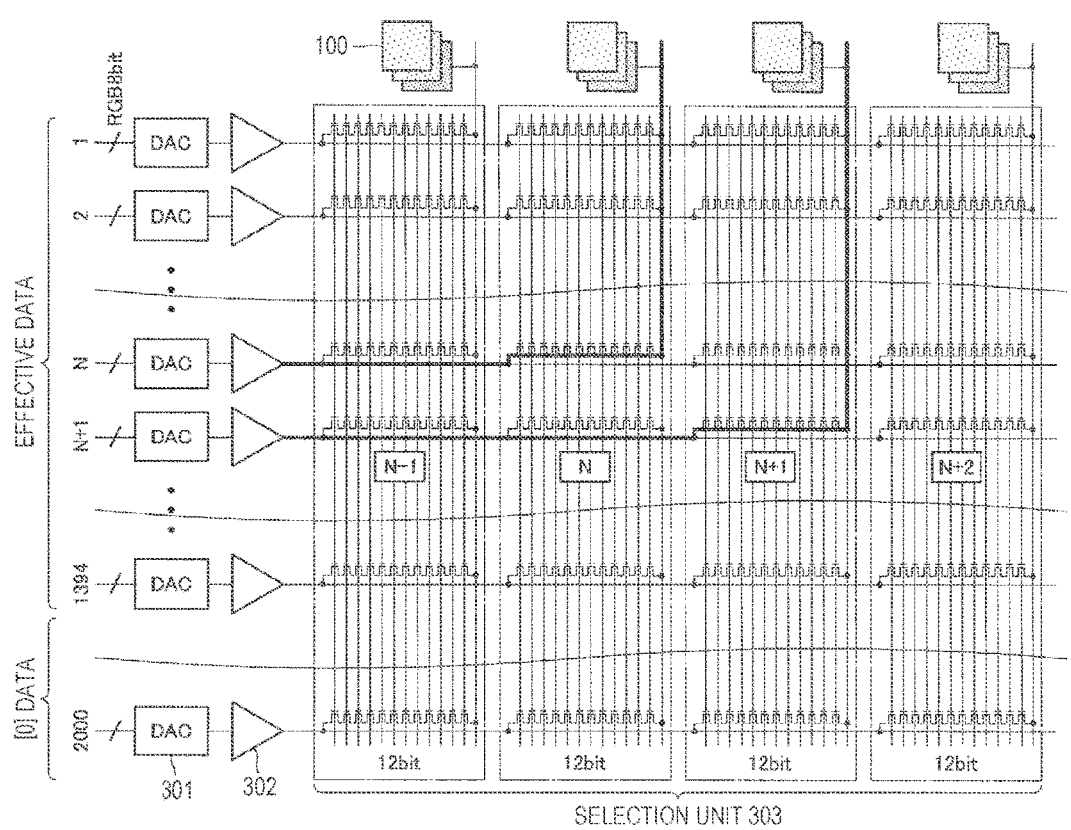
FIG. 28 is an explanatory view illustrating the operation in a case where a control signal incremented by one bit is input to the selection unit 303.

Furthermore, in a case where a control signal incremented by one bit from [000000000000] to [111111111111] is input to the selection unit 303, normal active matrix driving in which scanning is performed every 1 H is performed. FIG. 28 is an explanatory view illustrating the operation in a case where a control signal incremented by one bit is input to the selection unit 303.

Note that, although, in the embodiment, a method of selecting an analog value, which is output after DAC, at the selection units 201 and 303 is adopted, the disclosure is not limited to such an example, and can be achieved by a method of selecting a digital value.

Figure 29:
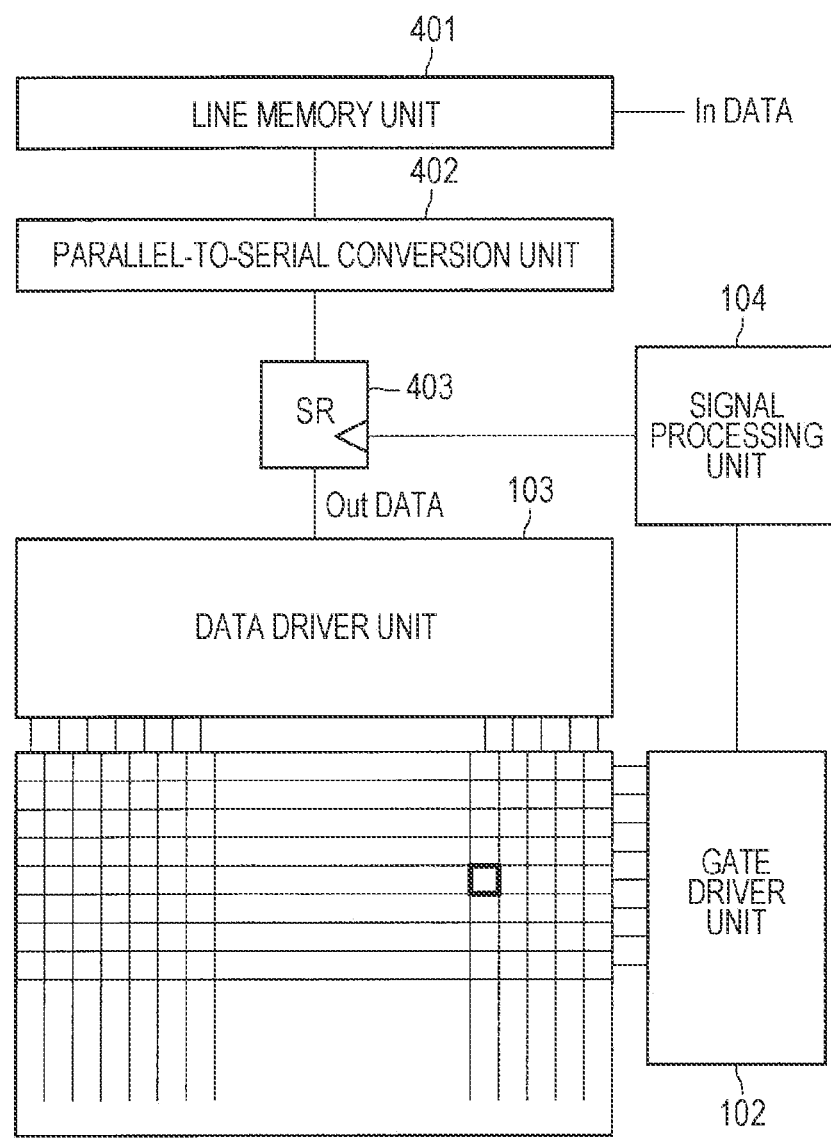
FIG. 29 is an explanatory view illustrating a configuration example of the display system according to the embodiment.

FIG. 29 is an explanatory view illustrating a configuration example of the display system according to the embodiment. In the example in FIG. 29, a line memory unit 401 is provided in the front stage of the data driver unit 103. A parallel-to-serial conversion unit 402 converts data stored in the line memory unit 401 from a parallel signal to a serial signal, and outputs the data. The data that has been converted into a serial signal is transmitted from a flip-flop 403 to the data driver unit 103 bit by bit on the basis of control data from the signal processing unit 104.

The parallel-to-serial unit 402 switches ON/OFF of a clock on the basis of the control data for the horizontal resolution generated by the signal processing unit 104. In a case where the flip-flop 403 is used and a logic, in which the clock is turned ON in a case of a control signal of one and the clock is turned OFF in a case of a control signal of zero, is adopted, next data is transferred in a case of a control signal of one, and data output of the preceding stage is kept in a case of zero. The flip-flop 403 transfers next data at the time when the clock is switched from low to high, that is, the clock is once turned ON.

Figure 30:
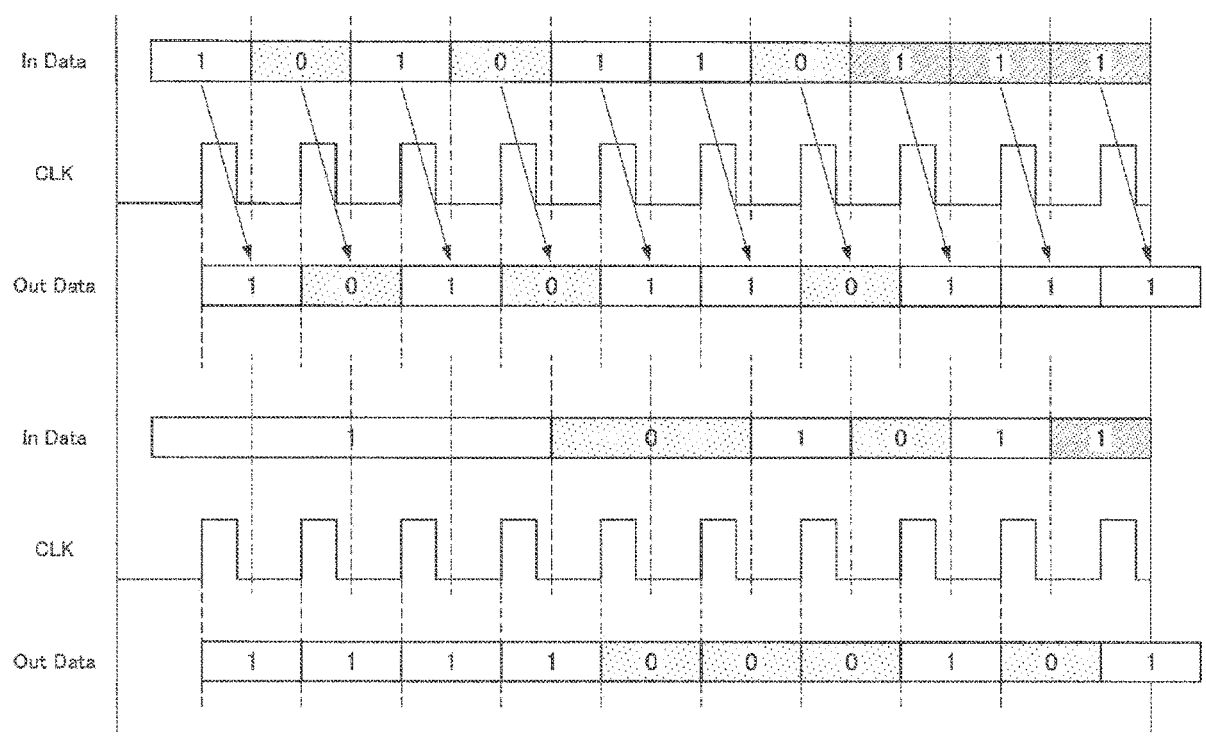
FIG. 30 is an explanatory view illustrating input/output of image data.

FIG. 30 is an explanatory view illustrating input/output of image data. The upper stage illustrates the input/output of image data in a case where input and output correspond one-to-one to each other. The lower stage illustrates the input/output of image data in a case where input and output do not necessarily correspond one-to-one to each other.

Normally, if data for seven pixels is input as in the upper stage in FIG. 30, data is output for seven pixels.

In contrast, in the embodiment, as illustrated in the lower stage in FIG. 30, seven pixels of original size are used. One pixel of four times the pixel size, one pixel of doubled pixel size, and one pixel of one time the original pixel size are arranged and displayed. A control signal [1000101] is input to the seven pixels. That is, the same data is transferred to the pixels of i=7 to 4. The same data is transferred to the pixels of i=3 to 2. The same data is transferred to the pixel of i=1. As a result of data being transferred to each pixel in this way, the magnification m=4, 2, and 1 can be expressed.

Figure 31:
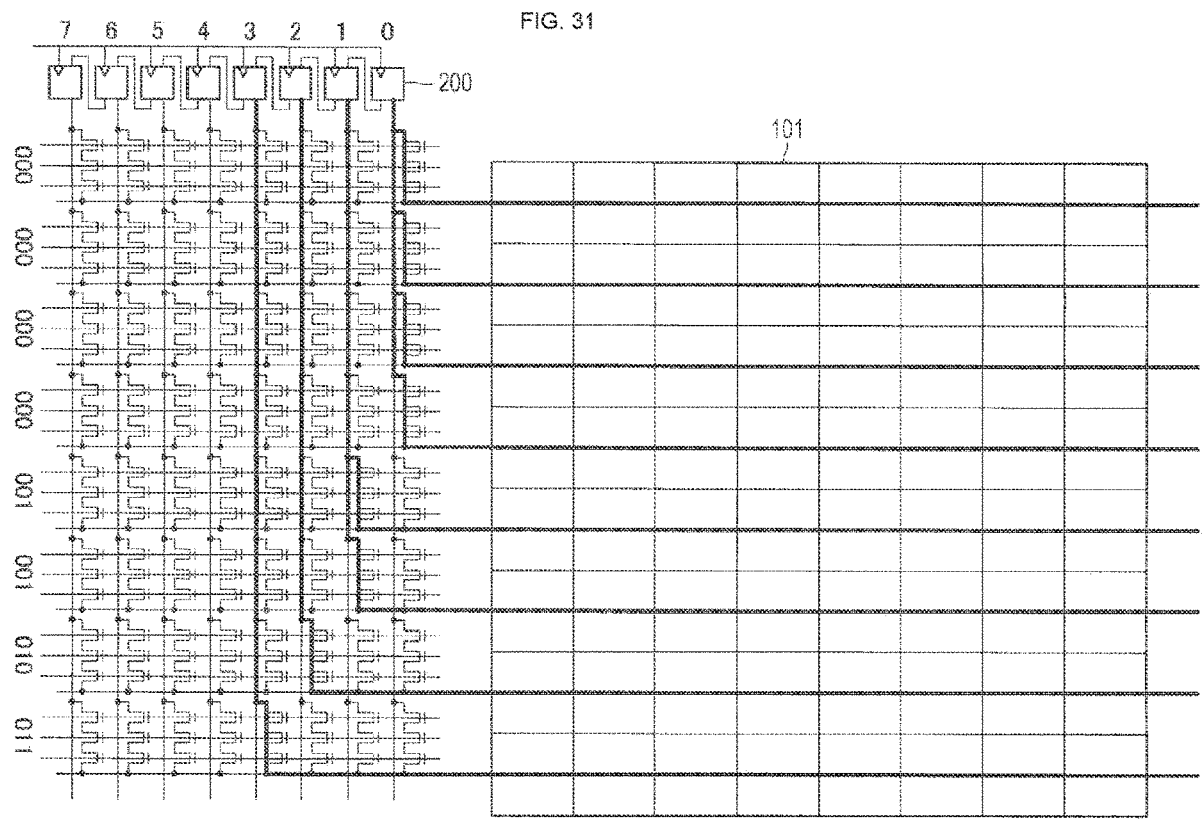
FIG. 31 is an explanatory view illustrating the driving of the gate driver unit 102.
Figure 32:
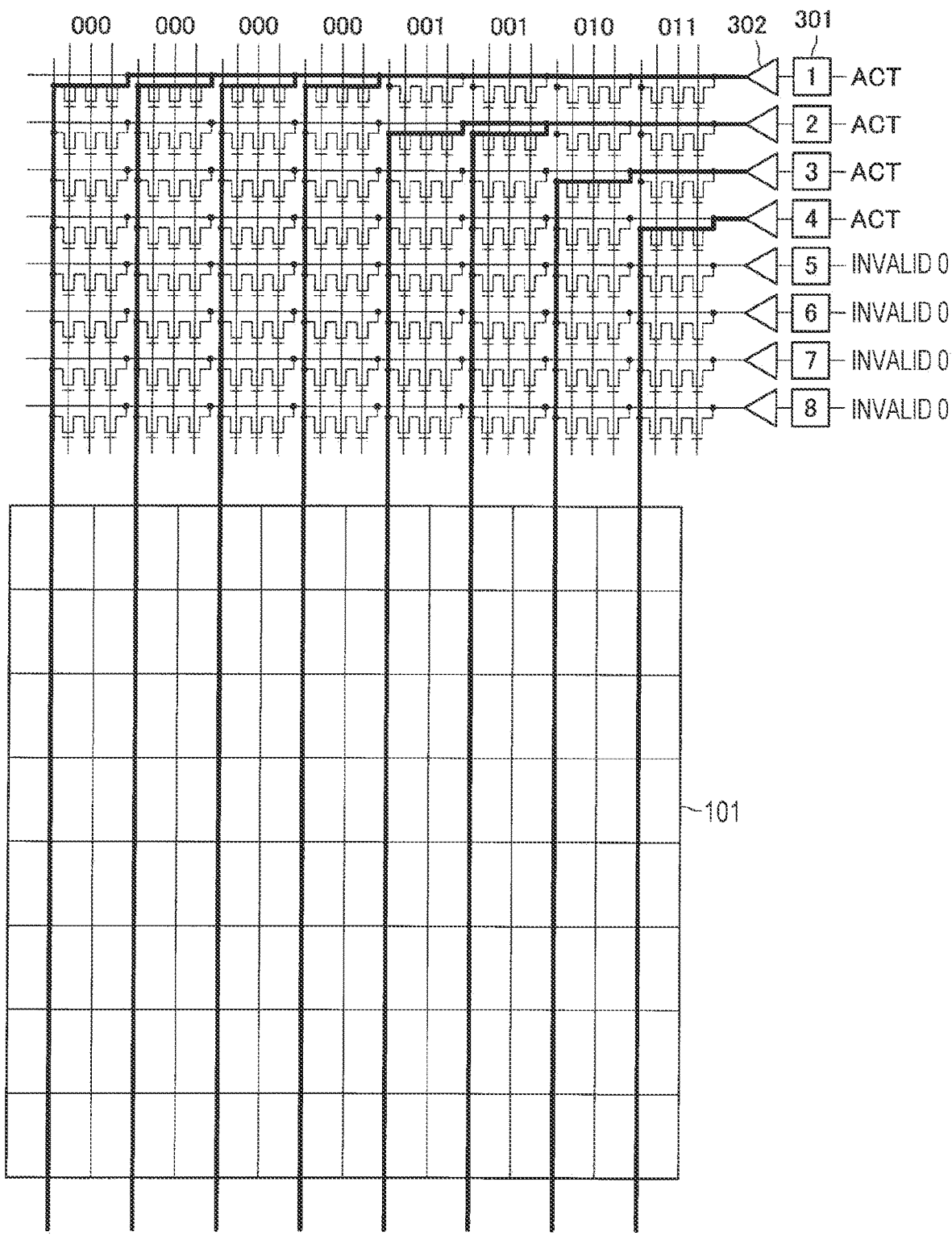
FIG. 32 is an explanatory view illustrating the driving of the data driver unit 103.

FIGS. 31 and 32 are explanatory views illustrating the driving of each of the gate driver unit 102 and the data driver unit 103. FIGS. 31 and 32 illustrate the driving at the time when three vertically and horizontally quadrupled pieces of data, three doubled pieces of data, and four one-time piece of data are displayed with respect to a panel with vertical eight pixels and horizontal eight pixels in one example. The display system according to the embodiment can display an image magnified to any magnification in any region of the panel unit 101 by the gate driver unit 102 and the data driver unit 103 driving in this way.

Although, in the above description, a fixed magnification value m is determined, the disclosure is not limited to such an example. For example, a line-of-sight of a user may be detected, and vertical synchronization may be performed in accordance with the detection result of the line-of-sight. A value of magnification and the number of pixels to be collected may be changed in a time direction.

Furthermore, the signal processing unit 104 may change the value of magnification and the number of pixels to be collected in the time direction in accordance with the substance of content to be displayed. For example, if information of a region (attention region) desired to be displayed with high resolution to a user is given as metadata into content to be displayed, the signal processing unit 104 may display the region in the original pixel size, and may determine magnification on the basis of a look-up table and the like in the other region.

Of course, the signal processing unit 104 may determine a region to be displayed in the original pixel size and a region to be displayed in a low resolution by combining the above-described result of detecting a line-of-sight and the result of the detecting the attention region. As a result, a plurality of regions to be displayed in the original pixel size may be placed in a screen. The signal processing unit 104 may perform signal processing in which a plurality of regions to be displayed in the original pixel size is displayed in the original pixel size and the other region has resolution gradually lowered toward the outer periphery of the image.

Although, in the embodiment, display control of magnifying an image is performed over a peripheral view-field region while using the same look-up table in the horizontal and vertical directions, the disclosure is not limited to such an example. Different look-up tables may be used in the horizontal and vertical directions. In this case, since human eyes have a wider central view-field region in the horizontal direction than that in the vertical direction, a look-up table, with which the resolution is higher in the horizontal direction than in the vertical direction, that is, a region displayed in the original pixel size is extended, may be used.

Furthermore, although, in the embodiment, an image is displayed with a resolution reduced by magnifying the image in the peripheral view-field region, the disclosure is not limited to such an example. A load at the time of displaying the image may be reduced not by limiting pixels to be displayed in the peripheral view-field region, that is, displaying the image to all pixels but by displaying the image while thinning out pixels.

Furthermore, although, in the embodiment, the method of freely changing a gate and data wiring reversibly by using a DAC has been described, the disclosure is not limited to such an example. An image may be displayed at a resolution reduced by making a part for collecting data to be displayed for a gate and data with a metal mask and magnifying the image for the peripheral view-field region.

2. CONCLUSION

As described above, according to the embodiment of the disclosure, there can be provided a display system capable of displaying a high-quality image while inhibiting a load at the time of displaying the image in front of a user by allowing a central part of a display to have high image quality and enlarging and displaying pixels in a peripheral part.

The display system according to the embodiment of the disclosure can reduce the load at the time of displaying an image as compared to that in the case where the image is displayed as it is for all pixels. The display system is particularly preferable to a small display system such as a head mounted display.

Each step in the processing executed by each apparatus in the specification does not necessarily need to be processed in a time series in the order described as a sequence diagram or a flowchart. For example, each step in the processing executed by each apparatus may be processed in an order different from the order described as a flowchart, or may be processed in parallel.

Furthermore, a computer program for causing hardware such as a CPU, a ROM, and a RAM built in each apparatus to exhibit functions equivalent to the configuration of each apparatus described above can also be created. Furthermore, a storage medium in which the computer program is stored can be provided. Furthermore, a series of processing can be performed by hardware by configuring each functional block illustrated in the functional block diagram by hardware.

Although the preferred embodiment of the disclosure has been described in detail above with reference to the accompanying drawings, the technical scope of the disclosure is not limited to such an example. It is obvious that a person having ordinary skill in the art of the disclosure can arrive at various alternations or modifications within the scope of the technical ideas set forth in the claims. These alternations or modifications are understood to naturally fall within the technical scope of the disclosure.

Furthermore, the effects described herein are merely illustrative or exemplary, and not limitative. That is, the technique according to the disclosure may have other effects that are obvious to a skilled person from the description of the specification, together with or in place of the above-described effects.

Note that, the configurations as described below also fall within the technical scope of the disclosure.

(1)
A display control apparatus including a signal processing unit that performs signal processing in which a first mode and a second mode are switchable at a first region in a screen and a region other than the first region in the screen, display being performed in the screen at a first resolution in the first mode, display being performed in the screen at a second resolution in the second mode.

(2)
The display control apparatus according to (1), in which the signal processing unit performs display while relatively reducing a resolution in the second mode from a center of the screen toward an outer periphery of the screen.

(3)
The display control apparatus according to (1), in which the signal processing unit determines the first region and the region other than the first region on the basis of a predetermined quadratic function specifying relation between a viewing angle from the center of the screen and a display magnification.

(4)
The display control apparatus according to (3), in which the signal processing unit determines the first region and the region other than the first region by linearly approximating the quadratic function.

(5)
The display control apparatus according to (3) or (4), in which the signal processing unit determines the first region and the region other than the first region by determining a size of a displayed region with respect to a viewing angle from the center of the screen.

(6)
The display control apparatus according to any one of (3) to (5), in which the signal processing unit determines the first region and the region other than the first region by determining a pixel number with respect to a viewing angle from the center of the screen.

(7)
The display control apparatus according to (5) or (6), in which the signal processing unit determines a display magnification with respect to each pixel of the screen.

(8)
The display control apparatus according to any one of (1) to (7), in which the signal processing unit determines the first region on the basis of an attention region of content displayed in the screen.

(9)
The display control apparatus according to any one of (1) to (8), in which the signal processing unit determines the first region on the basis of a result of detecting a line-of-sight of a user watching the screen.

(10)
The display control apparatus according to any one of (1) to (9), in which the signal processing unit outputs a signal for driving a driver to the driver, the driver supplying a signal to a pixel of the screen.

(11)
The display control apparatus according to any one of (1) to (10), in which one piece of display information corresponds to one pixel of the screen in the first resolution.

(12)
The display control apparatus according to any one of (1) to (11), in which the first resolution is higher than the second resolution.

(13)
A head mounted display including the display control apparatus according to any one of (1) to (12).

(14)
A display control method including a processor performing signal processing in which a first mode and a second mode are switchable at a first region in a screen and a region other than the first region in the screen, display being performed in the screen at a first resolution in the first mode, display being performed in the screen at a second resolution in the second mode.

(15)
A computer program causing a computer to perform signal processing in which a first mode and a second mode are switchable at a first region in a screen and a region other than the first region in the screen, display being performed in the screen at a first resolution in the first mode, display being performed in the screen at a second resolution in the second mode.

REFERENCE SIGNS LIST

100 Pixel
200 Scanner unit
202 Buffer unit
203 Output node

The invention claimed is:

1. A display device, comprising:
a signal controller configured to:
    determine a first region and a second region on a screen based on a user's line-of-sight toward the screen, wherein the second region is different from the first region;
    generate first image data with a first resolution based on data corresponding to the first region of image data; and
    generate second image data with a second resolution by thinning out data corresponding to the second region of the image data, wherein the second resolution is lower than the first resolution.

2. The display device according to claim 1, wherein the first region is a region which the user focuses on, and the second region is a region outside the first region.

3. The display device according to claim 1, further comprising a display panel configured to display, on the screen, a first image based on the first image data and a second image based on the second image data.

4. The display device according to claim 3, wherein the signal controller is configured to transmit the first image data and the second image data to the display panel.

5. The display device according to claim 1, further comprising a detector configured to detect the user's line-of-sight toward the screen.

6. The display device according to claim 1, further comprising a gaze detector configured to detect the user's line-of-sight toward the screen.

7. The display device according to claim 1, wherein a resolution of the image data is the first resolution.

8. The display device according to claim 1, wherein the first region in a horizontal direction is wider than the first region in a vertical direction.

9. The display device according to claim 1, wherein the first region is a region with a FOV (field of view) of 40 degrees.

* * * * *